US005696067A

United States Patent [19]

Adams et al.

[11] Patent Number: 5,696,067
[45] Date of Patent: Dec. 9, 1997

[54] HYDROXY-GROUP CONTAINING ACYLATED NITROGEN COMPOUNDS USEFUL AS ADDITIVES FOR LUBRICATING OIL AND FUEL COMPOSITIONS

[75] Inventors: Paul E. Adams, Willoughby Hills; Mark R. Baker, Lyndhurst; Jeffry G. Dietz, University Heights, all of Ohio

[73] Assignee: The Lubrizol Corporation, Wickliffe, Ohio

[21] Appl. No.: 632,570

[22] Filed: Apr. 15, 1996

[51] Int. Cl.$^6$ .................... C10M 133/16; C10L 1/22
[52] U.S. Cl. .................... 508/476; 508/551; 508/555; 44/391; 44/418; 560/179; 560/183; 564/201; 564/204
[58] Field of Search .................... 564/201, 204; 508/222, 305, 454; 44/330

[56] References Cited

U.S. PATENT DOCUMENTS

| | | | |
|---|---|---|---|
| 2,968,629 | 1/1961 | Thompson | 508/222 |
| 3,062,631 | 11/1962 | Thompson | 44/330 |
| 3,172,892 | 3/1965 | Le Suer et al. | 260/326.5 |
| 3,200,075 | 8/1965 | Anderson | 508/305 |
| 3,215,707 | 11/1965 | Rense | 260/326.3 |
| 3,454,607 | 7/1969 | Le Suer et al. | 260/408 |
| 3,666,810 | 5/1972 | Hoke | 564/204 |
| 3,734,865 | 5/1973 | Heiba et al. | 508/305 |
| 3,758,514 | 9/1973 | Heiba et al. | 508/222 |
| 3,954,808 | 5/1976 | Elliott et al. | 260/343.2 R |
| 3,966,807 | 6/1976 | Elliott et al. | 260/559 D |
| 4,046,802 | 9/1977 | Elliott et al. | 560/61 G |
| 4,051,049 | 9/1977 | Elliott et al. | 252/51.5 A |
| 4,083,791 | 4/1978 | Elliott et al. | 252/51.5 A |
| 4,108,784 | 8/1978 | Bryant | 252/56 R |
| 4,194,886 | 3/1980 | Ripple | 44/70 |
| 4,205,960 | 6/1980 | Bryant | 44/68 |
| 4,234,435 | 11/1980 | Meinhardt et al. | 252/51.5 A |
| 4,285,824 | 8/1981 | Bryant | 252/56 |
| 4,851,434 | 7/1989 | Deckner | 564/201 |
| 4,866,142 | 9/1989 | Gutierrez et al. | 564/201 |
| 5,137,980 | 8/1992 | DeGonia et al. | 525/327.6 |
| 5,336,278 | 8/1994 | Adams et al. | 44/419 |
| 5,458,793 | 10/1995 | Adams et al. | 252/47 |

FOREIGN PATENT DOCUMENTS

| | | |
|---|---|---|
| 0331556A2 | 6/1989 | European Pat. Off. . |
| WO 95/31488 | 11/1995 | WIPO . |

OTHER PUBLICATIONS

B.B. Jarvis et al., Synthesis, 11, 1079 (Nov. 1990).
K. Mikami et al., Chem. Rev. 92, 1021 (May 1992).
M. Terada et al., Tetrahedron Letters, 35, 6693 (May 1994).
D. Savostianoff, C.R. Acad. Sc. Paris, 263, 605 (Aug. 22, 1966).

*Primary Examiner*—Ellen M. McAvoy
*Attorney, Agent, or Firm*—Joseph P. Fischer; Frederick D. Hunter; James L. Cordek

[57] ABSTRACT

Compositions comprising hydroxyl group containing acylated nitrogen compounds, a process for reacting certain carboxylic reactants with olefinic compounds then reacting the product prepared thereby with ammonia, a hydrazine or an amine, products prepared thereby and lubricating oil and fuel compositions.

85 Claims, No Drawings

HYDROXY-GROUP CONTAINING ACYLATED NITROGEN COMPOUNDS USEFUL AS ADDITIVES FOR LUBRICATING OIL AND FUEL COMPOSITIONS

FIELD OF THE INVENTION

This invention relates to hydroxyl group containing acylated nitrogen compounds which are useful as low chlorine containing additives for lubricating oils and normally liquid fuels and a process for preparing the compounds.

BACKGROUND OF THE INVENTION

Numerous types of additives are used to improve lubricating oil and fuel compositions. Such additives include, but are certainly not limited to dispersants and detergents of the ashless and ash-containing variety, oxidation inhibitors, anti-wear additives, friction modifiers, and the like. Such materials are well known in the art and are described in many publications, for example, Smalheer, et al. "Lubricant Additives", Lezius-Hiles Co., Cleveland. Ohio, USA (1967); M. W. Ranney, Ed., "Lubricant Additives", Noyes Data Corp. Park Ridge. N.J., USA (1973); M. J. Satriana, Ed. "Synthetic Oils and Lubricant Additives, Advances since 1977", Noyes Data Corp., Park Ridge N.J., USA (1982), W. C. Gergel. "Lubricant Additive Chemistry", Publication 694-320-65R1 of the Lubrizol Corp., Wickliffe, Ohio, USA (1994); and W. C. Gergel et ET AL, "Lubrication Theory and Practice" Publication 794-320-59R3 of the Lubrizol Corp., Wickliffe, Ohio, USA (1994); and in numerous United States patents, for example Chamberlin, III. U.S. Pat. No. 4,326, 972, Schroeck et al, U.S. Pat. No. 4,904,401, and Ripple et al, U.S. Pat. No. 4,981,602. Many such additives are frequently derived from carboxylic reactants, for example, acids. esters, anhydrides, lactones, and others. Specific examples of commonly used carboxylic compounds used as intermediates for preparing lubricating oil additives include alkyl-and alkenyl substituted succinic acids and anhydrides, polyolefin substituted carboxylic acids, aromatic acids, such as salicylic acids, and others. Illustrative carboxylic compounds are described in Meinhardt. et al, U.S. Pat. No. 4,234,435; Norman et al, U.S. Pat. No. 3,172,872; LeSuer et al, U.S. Pat. No. 3,454,607, and Rense, U.S. Pat. No. 3,215,707.

Many carboxylic intermediates used in the preparation of lubricating oil additives contain chlorine. While the amount of chlorine present is often only a very small amount of the total weight of the intermediate, the chlorine frequently is carried over into the carboxylic derivative which is desired as an additive. For a variety of reasons, including environmental reasons, the industry has been making efforts to reduce or to eliminate chlorine from additives designed for use as lubricant or fuel additives. The matter of chlorine content in additives is discussed in numerous patents including U.S. Pat. Nos. 5,356,552; 5,370,805; 5,445,657 and 5,454,964.

Accordingly, it is desirable to provide low chlorine or chlorine free additives for use in lubricants and fuels.

The present invention provides hydroxy group containing acylated nitrogen compounds which meet this requirement.

B. B. Snider and J. W. van Straten, J. Org. Chem., 44, 3567–3571 (1979) describe certain products prepared by the reaction of methyl glyoxylate with several butenes and cyclohexenes. K. Mikami and M. Shimizu, Chem. Rev., 92, 1021–1050 (1992) describe carbonyl-ene reactions, including glyoxylate-ene reactions. D. Savostianov (communicated by P. Pascal), C. R. Acad. Sc. Paris, 263, (605–7) (1966) relates to preparation of some α-hydroxylactones via the action of glyoxylic acid on olefins. M. Kerfanto et. al., C. R. Acad. Sc. Paris, 264, (232–5) (1967) relates to condensation reactions of α-α-di-(N-morpholino)-acetic acid and glyoxylic acid with olefins. B. B. Jarvis et al, Synthesis, 1079–82 (1990) relates to reactions of oxocarboxylic acids with olefins under acidic conditions to give α-hydroxy butyrolactones.

Fuels containing additives to improve the performance thereof are described in the numerous patents including the following United States patents:

| | |
|---|---|
| 4,071,327 | 5,336,278 |
| 4,379,065 | 5,356,546 |
| 4,400,178 | 5,458,793 |
| 4,564,460 | |

SUMMARY OF THE INVENTION

The present invention provides a composition comprising a compound of the formula

wherein each of $R^1$ and $R^2$ is H or a hydrocarbon based group, $R^3$ is H or hydrocarbyl;

$R^4$ is a divalent hydrocarbylene group;

n=0 or 1;

y is an integer ranging from 1 to about 200;

A is a hydrocarbyl group or a hydroxy-substituted hydrocarbyl group; and each of $R^9$ and $R^{10}$ is independently H, alkoxyhydrocarbyl, hydroxyhydrocarbyl, hydrocarbyl, aminohydrocarbyl, N-alkoxyalkyl- or hydroxyalkyl-substituted aminohydrocarbyl, or a group of the formula $-(Y)_a R^{11}$—B, wherein each Y is a group of the formula

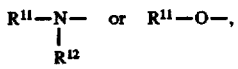

each $R^{11}$ is a divalent hydrocarbyl group, $R^{12}$ is as defined above for $R^9$ and $R^{10}$, and B is H, hydrocarbyl, amino, hydroxyhydrocarbyl, an amide group, an amide-containing group, an acylamino group, an imide group, or an imide-containing group, and a is 0 or a number ranging from 1 to about 100, provided that no more than three $R^9$, $R^{10}$, and $R^{12}$ contain amide groups, imide-containing groups, acylamino groups or amide-containing groups; or $R^9$ and $R^{10}$ taken together with the adjacent N constitute a nitrogen-containing heterocyclic group optionally, further containing one or more additional heteroatoms selected from the group consisting of N, O and S; or one of $R^9$ and $R^{10}$ taken together with the adjacent N constitute a N—N group.

In another aspect of this invention, there is provided a process comprising first reacting, optionally in the presence of an acidic catalyst selected from the group consisting of organic sulfonic acids. heteropolyacids, Lewis acids. and mineral acids, (A) at least one olefinic compound containing at least one group of the formula

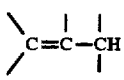

and (B) at least one carboxylic reactant selected from the group consisting of compounds of the formula $$R^3C(O)(R^4)_nC(O)OR^5 \quad (IV)$$

and compounds of the formula

wherein each of $R^3$, $R^5$ and $R^9$ is independently H or a hydrocarbyl group, $R^4$ is a divalent hydrocarbylene group, and n is 0 or 1; wherein (A) and (B) are reacted in amounts ranging from 0.6 moles (B) per mole of (A) to 1.5 moles (B) per equivalent of (A); then reacting the product formed thereby with from about 0.5 equivalents up to about 2 moles, per mole of (B) of at least one of (C) ammonia or a hydrazine or an amine characterized by the presence within its structure of at least one H—N group and products prepared by this process.

Also provided are additive concentrates for preparing lubricating oil and fuel compositions, lubricating oil compositions and fuel compositions.

DETAILED DESCRIPTION OF THE PREFERRED EMBODIMENTS

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing non-hydrocarbon substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms.

In general, no more than about three non-hydrocarbon substituents or hereto atoms, and preferably no more than one, will be present for every 10 carbon atoms in the hydrocarbon, hydrocarbyl or hydrocarbon based groups. Most preferably, the groups are purely hydrocarbon in nature, that is they are essentially free of atoms other than carbon and hydrogen.

Throughout the specification and claims the expression soluble or dispersible is used. By soluble or dispersible is meant that an amount needed to provide the desired level of activity or performance can be incorporated by being dissolved, dispersed or suspended in an oil of lubricating viscosity or in a normally liquid fuel. Usually, this means that at least about 0.001% by weight of the material can be incorporated in a lubricating oil or normally liquid fuel. For a further discussion of the terms oil soluble and dispersible, particularly "stably dispersible", see U.S. Pat. No. 4,320,019 which is expressly incorporated herein by reference for relevant teachings in this regard.

As noted hereinabove, provided by this invention are certain hydroxy-containing nitrogen compounds and a process for preparing low chlorine or chlorine free compositions useful as low chlorine or chlorine free additives for lubricating oil and fuel compositions.

The Compounds

In one embodiment, this invention relates to a composition comprising a compound of the formula

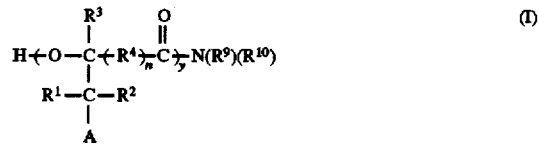

wherein A is a hydrocarbyl group or a hydroxy-substituted hydrocarbyl group. In one embodiment A is selected from groups of the formula

and

wherein z=0 or 1;

X is a divalent hydrocarbyl group selected from the group consisting of

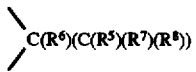

when z=0, and

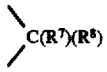

when z=1; and each of $R^5$, $R^6$, $R^7$, and $R^8$ is independently H or a hydrocarbon based group.

$R^5$ is H or hydrocarbyl. When $R^5$ is hydrocarbyl, it is usually an aliphatic group, often a group containing from 1 to about 30 carbon atoms, often from 8 to about 18 carbon atoms. In another embodiment, $R^5$ is lower alkyl, wherein "lower alkyl" is defined hereinabove. Most often, $R^5$ is H or lower alkyl.

When at least one of $R^6$, $R^7$ and $R^8$ is a hydrocarbyl group, it preferably contains from 7 to about 5,000 carbon atoms. More often, such hydrocarbon groups are aliphatic groups. In one embodiment $R^6$ is an aliphatic group containing from about 10 to about 300 carbon atoms. In another embodiment, $R^6$ contains from 30 to about 100 carbon atoms and is derived from homopolymerized and interpolymerized $C_{2-18}$ olefins.

In a further embodiment, at least one of $R^7$ and $R^8$ is an aliphatic group containing from 10 to about 300 carbon atoms. Often, at least one of $R^7$ and $R^8$ contains from about 30 to about 100 carbon atoms and is derived from homopolymerized and interpolymerized $C_{2-18}$ olefins. The polymerized olefins are frequently 1-olefins, preferably ethylene, propylene, butenes, isobutylene, and mixtures thereof. Polymerized olefins are often referred to herein as polyolefins.

In yet another embodiment at least one of $R^7$ and $R^8$ is an aliphatic group containing from 8 to about 24 carbon atoms. In another embodiment at least one $R^7$ and $R^8$ is an aliphatic group containing 12 to about 50 carbon atoms. Within this embodiment, most often one of $R^7$ and $R^8$ is H and the other is the aliphatic group.

Each of $R^1$ and $R^2$ is H or a hydrocarbon based group. In one particular embodiment, each of $R^1$ and $R^2$ is independently H or a lower alkyl group provided at least one is lower alkyl. In another embodiment, one of $R^1$ and $R^2$ is H and the other is lower alkyl. As used herein, the expression "lower alkyl" refers to alkyl groups containing from 1 to 7 carbon atoms. Examples include methyl, ethyl and the various isomers of propyl, butyl, pentyl, hexyl and heptyl. In one especially preferred embodiment, each of $R^1$ and $R^2$ is H.

$R^3$ is H or hydrocarbyl. These hydrocarbyl groups are usually aliphatic, that is, alkyl or alkenyl, preferably alkyl, more preferably lower alkyl. Especially preferred is where $R^3$ is H or methyl, most preferably, H.

$R^4$ is a divalent hydrocarbylene group. This group may be aliphatic or aromatic, but is usually aliphatic. Often, $R^4$ is an alkylene group containing from 1 to about 3 carbon atoms. The 'n' is 0 or 1; that is, in one embodiment $R^4$ is present and in another embodiment, $R^4$ is absent. More often, $R^4$ is absent.

In one preferred embodiment, each of $R^1$, $R^2$ and $R^3$ is independently hydrogen or a lower alkyl or alkenyl group. In one especially preferred embodiment, each of $R^1$, $R^2$ and $R^3$ is hydrogen and each of y and n=0.

In another preferred embodiment, $R^6$ is an aliphatic group containing from about 8 to about 150 carbon atoms, $R^5$ is H, n is 0 and $R^3$ is H.

The subscript 'y' is an integer ranging from 1 to about 200, more often from 1 to about 50 and even more often from 1 to about 20. Frequently y is 1.

Each of $R^9$ and $R^{10}$ is independently H, alkoxyhydrocarbyl, hydroxyhydrocarbyl, hydrocarbyl, aminohydrocarbyl, N-alkoxyalkyl- or hydroxyalkyl-substituted aminohydrocarbyl, or a group of the formula $-(Y)_a R^{11}-B$, wherein each Y is a group of the formula

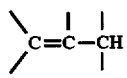

each $R^{11}$ is a divalent hydrocarbyl group, $R^{12}$ is as defined above for $R^9$ and $R^{10}$, and B is H, hydrocarbyl, amino, hydroxyhydrocarbyl, an amide group, an amide-containing group, an acylamino group, an imide group, or an imide-containing group, and a is 0 or a number ranging from 1 to about 100, provided that no more than three $R^9$, $R^{10}$, and $R^{12}$ contain amide groups, imide-containing groups, acylamino groups or amide-containing groups; or $R^9$ and $R^{10}$ taken together with the adjacent N constitute a nitrogen-containing heterocyclic group; or one of $R^9$ and $R^{10}$ taken together with the adjacent N constitute a N—N group.

The Process

In another embodiment, the present invention relates to a process comprising first reacting, optionally in the presence of an acidic catalyst selected from the group consisting of organic sulfonic acids, heteropolyacids, Lewis acids, and mineral acids.

(A) at least one olefinic compound containing at least one group of the formula

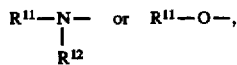

and (B) at least one carboxylic reactant selected from the group consisting of compounds of the formula $$R^3C(O)(R^4)_nC(O)OR^5 \qquad (IV)$$

and compounds of the formula

wherein each of $R^3$, $R^5$ and $R^9$ is independently H or a hydrocarbyl group, $R^4$ is a divalent hydrocarbylene group, and n is 0 or 1: wherein (A) and (B) are reacted in amounts ranging from 0.6 moles (B) per mole of (A) to 1.5 moles (B) per equivalent of (A); then reacting the product formed thereby with from about 0.5 equivalents up to about 2 moles, per mole of (B) of at least one of (C) ammonia or a hydrazine or an amine characterized by the presence within its structure of at least one H—N group.

With respect to the first step of the process, while both of reactants (A) and (B) may be present at the same time, it has been found that improvements in yield and purity of product are attained when the carboxylic reactant (B) is added, either portionwise or continuously, over an extended period of time, usually up to about 10 hours, more often from 1 hour up to about 6 hours, frequently from about 2–4 hours.

Optionally the first step of the process may be conducted in the presence of an azeotroping solvent. Well known azeotroping solvents include toluene, xylene, cyclohexane, etc. Cyclohexane is preferred. When an azeotroping solvent is used, the mode of combining reactants (A) and (B) does not appear to have an appreciable effect.

The Catalyst

The first step of the process of this invention is optionally conducted in the presence of an acidic catalyst. Acid catalysts, such as organic sulfonic acids, for example, para-toluene sulfonic acid, methane sulfonic acid and sulfonated polymers such as those marketed under the tradename Amberlyst® (Rohm & Haas), heteropolyacids, the complex acids of heavy metals (e.g., Mo, W, Sn, V, Zr, etc.) with phosphoric acids (e.g., phosphomolybdic acid), and mineral acids, for example, $H_2SO_4$ and phosphoric acid, are useful. The amount of catalyst used is generally small, ranging from about 0.01 mole % to about 10 mole %, more often from about 0.1 mole % to about 2 mole %, based on moles of olefinic reactant.

(A) The Olefinic Compound

The olefinic compound employed as a reactant in the process of this invention contains at least one group of the formula

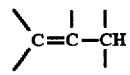

and has the general formula $$(R^1)(R^2)C=C(R^6)(CH(R^7)(R^8)) \qquad (III)$$

wherein each of $R^1$ and $R^2$ is, independently, hydrogen or a hydrocarbon based group. Each of $R^6$, $R^7$ and $R^8$ is, independently, hydrogen or a hydrocarbon based group; preferably at least one is a hydrocarbon based group containing at least 7 carbon atoms. These olefinic compounds are diverse in nature.

Virtually any compound containing an olefinic bond may be used provided it meets the general requirements set forth hereinabove for (III) and does not contain any functional groups (e.g., primary or secondary amines) that would interfere with the carboxylic reactant (B). Useful olefinic compounds may be terminal olefins, i.e., olefins having a $H_2C=C$ group, or internal olefins. Useful olefinic compounds may have more than one olefinic bond, i.e., they may be dienes, trienes, etc. Most often they are mono-olefinic. Examples include linear α-olefins, cis- or trans-disubstituted olefins, trisubstituted olefins and tetrasubstituted olefins.

When (A) is monoolefinic, one mole of (A) contains one equivalent of C=C; when (A) is diolefinic, one mole of (A) contains 2 equivalents of C=C bonds; when (A) is triolefinic, one mole of (A) contains 3 equivalents of C=C bonds, and so forth.

Aromatic double bonds are not considered to be olefinic double bonds within the context of this invention.

As used herein, the expression "polyolefin" defines a polymer derived from olefins. The expression "polyolefinic" refers to a compound containing more than one C=C bond.

Among useful compounds are those that are purely hydrocarbon, i.e., those substantially free of non-hydrocarbon groups, or they may contain one or more non-hydrocarbon groups as discussed in greater detail herein.

In one embodiment, the olefinic compounds are substantially hydrocarbon, that is, each R group in (III) is H or contains essentially carbon and hydrogen. In one aspect within this embodiment, each of $R^1$, $R^2$, $R^7$ and $R^8$ is hydrogen and $R^6$ is a hydrocarbyl group containing from 7 to about 5,000 carbon atoms, more often from about 30 up to about 200 carbon atoms, preferably from about 50 up to about 100 carbon atoms. In another aspect of this embodiment, each of $R^1$ and $R^2$ is hydrogen, $R^6$ is H or a lower alkyl group and the group $(CH(R^7)(R^8))$ is a hydrocarbyl group containing from 7 to about 5,000 carbon atoms, more typically from about 30 up to about 200 carbon atom, preferably from 50 up to about 100 carbon atoms.

In another embodiment, one or more of the R groups present in (III) is an organic radical which is not purely hydrocarbon. Such groups may contain or may be groups such as carboxylic acid, ester, amide, salt, including ammonium, amine and metal salts, cyano, hydroxy, thiol, tertiary amino, nitro, alkali metal mercapto and the like. Illustrative of olefinic compounds (III) containing such groups are methyl oleate, oleic acid, 2-dodecenedioic acid, octene diol, linoleic acid and esters thereof, and the like.

Preferably, the hydrocarbyl groups are aliphatic groups. In one preferred embodiment, when an R group is an aliphatic group containing a total of from about 30 to about 100 carbon atoms, the olefinic compound is derived from homopolymerized and interpolymerized $C_{2-18}$ mono- and di-olefins, preferably 1-olefins. In a preferred embodiment, the olefins contain from 2 to about 5 carbon atoms, preferably 3 or 4 carbon atoms. Examples of such olefins are ethylene, propylene, butene-1, isobutylene, butadiene, isoprene, 1-hexene, 1-octene, etc. R groups can, however, be derived from other sources, such as monomeric high molecular weight alkenes (e.g. 1-tetracontene), aliphatic petroleum fractions, particularly paraffin waxes and cracked analogs thereof, White oils, synthetic alkenes such as those produced by the Ziegler-Natta process (e.g., poly-(ethylene) greases) and other sources known to those skilled in the art. Any unsaturation in the R groups may be reduced by hydrogenation according to procedures known in the art, provided at least one olefinic group remains as described for (III).

In one preferred embodiment, at least one R is derived from polybutene, that is, polymers of $C_4$ olefins, including 1-butene, 2-butene and isobutylene. Those derived from isobutylene, i.e., polyisobutylenes, are especially preferred. In another preferred embodiment, R is derived from polypropylene. In another preferred embodiment, R is derived from ethylene-alpha olefin polymers, including ethylene-propylene-diene polymers. Representative of such polymers are the ethylene-propylene copolymers and ethylene-propylene-diene terpolymers marketed under the Trilene® tradename by the Uniroyal Company. Molecular weights of such polymers may vary over a wide range, but especially preferred are those having number average molecular weights ($\overline{M}_n$) ranging from about 300 to about 20,000, preferably 700 to about 10000, often from 900 to 2500. In one preferred embodiment, the olefin is an ethylene-propylene-diene copolymer having $\overline{M}_n$ ranging from about 900 to about 8000, often up to about 2000. Such materials are included among the Trilene® polymers marketed by the Uniroyal Company. Middlebury, Conn., USA and Orthoeum® 2052, marketed by the DuPont Company.

Ethylene-alpha olefin copolymers and ethylene-lower olefin-diene terpolymers are described in numerous patent documents, including European patent publication EP 279, 863, Japanese patent publication 87-129,303 and the following United States patents:

| | |
|---|---|
| 3,598,738 | 4,357,250 |
| 4,026,809 | 4,658,078 |
| 4,032,700 | 4,668,834 |
| 4,137,185 | 4,937,299 |
| 4,156,061 | 5,324,800 |
| 4,320,019 | | each of which is incorporated herein by reference for relevant disclosures of these ethylene based polymers.

A preferred source of hydrocarbyl groups R are polybutenes obtained by polymerization of a $C_4$ refinery stream having a butene content of 35 to 75 weight percent and isobutylene content of 15 to 60 weight percent in the presence of a Lewis acid catalyst such as aluminum trichloride or boron trifluoride. These polybutenes contain predominantly (greater than 80% of total repeating units) isobutylene repeating units of the configuration

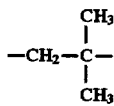

These polybutenes are typically monoolefinic, that is they contain but one olefinic bond per molecule.

The olefinic compound may be a polyolefin comprising a mixture of isomers wherein from about 50 percent to about 65 percent are tri-substituted olefins wherein one substituent contains from 2 to about 500 carbon atoms, often from about 30 to about 200 carbon atoms, more often from about 50 to about 100 carbon atoms, usually aliphatic carbon atoms, and the other two substituents are lower alkyl.

When the olefin is a tri-substituted olefin, it frequently comprises a mixture of cis- and trans- 1-lower alkyl, 1-(aliphatic hydrocarbyl containing from 30 to about 100 carbon atoms), 2-lower alkyl ethene and 1,1-di-lower alkyl, 2-(aliphatic hydrocarbyl containing from, 30 to about 100 carbon atoms) ethene.

In one embodiment, the monoolefinic groups are predominantly vinylidene groups, i.e., groups of the formula

especially those of the formula

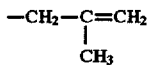

although the polybutenes may also comprise other olefinic configurations.

In one embodiment the polybutene is substantially monoolefinic, comprising at least about 30 mole %, preferably at least about 50 mole % vinylidene groups. more often at least about 70 mole % vinylidene groups. Such materials and methods for preparing them are described in U.S. Pat. Nos. 5,071,919; 5,137,978; 5,137,980; 5,286,823 and 5,408,018, and in published European patent application EP646103-A1, each of which is expressly incorporated herein by reference. They are commercially available, for example under the tradenames Ultravis (BP Chemicals) and Glissopal (BASF).

As is apparent from the foregoing, olefins of a wide variety of type and of molecular weight are useful for preparing the compositions of this invention. Useful olefins are usually substantially hydrocarbon and have number average molecular weight ranging from about 100 to about 70,000, more often from about 200 to about 7,000, even more often from about 1,300 to about 5,000, frequently from about 400 to about 3,000.

Specific characterization of olefin reactants (A) used in the processes of this invention can be accomplished by using techniques known to those skilled in the art. These techniques include general qualitative analysis by infrared and determinations of average molecular weight, e.g., $\overline{M}_n$, number average molecular weight and $\overline{M}_w$, weight average molecular weight. etc. employing vapor phase osmometry (VPO) and gel permeation chromatography (GPC). Structural details can be elucidated employing proton and carbon 13 ($C^{13}$) nuclear magnetic resonance (NMR) techniques. NMR is useful for determining substitution characteristics about olefinic bonds, and provides some details regarding the nature of the substituents. More specific details regarding substituents about the olefinic bonds can be obtained by cleaving the substituents from the olefin by, for example, ozonolysis, then analyzing the cleaved products, also by NMR, GPC, VPO, and by infra-red analysis and other techniques known to the skilled person.

One mole of olefin is defined as the formula weight or number average molecular weight ($\overline{M}_n$) of an olefinic compound. The equivalent weight is defined as the formula weight or $\overline{M}_n$ of the olefin divided by the number of olefinic bonds present per olefinic compound. To illustrate, one mole of butene is 56.11. The equivalent weight of butene is also 56.11 since the formula weight divided by the number of olefinic bonds (one) equals the formula weight. Butadiene has two olefinic bonds. The formula weight of butadiene is 54.09. The equivalent weight is 54.09/2 or 27.05, one-half of the formula weight.

(B) The Carboxylic Reactant

The carboxylic reactant is at least one member selected from the group consisting of compounds of the formula $$R^3C(O)(R^4)_nC(O)OR^5 \qquad (IV)$$

and compounds of the formula

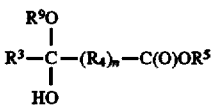

wherein each of $R^3$, $R^5$ and $R^9$ is independently H or a hydrocarbyl group, $R^4$ is a divalent hydrocarbylene group, and n is 0 or 1. Specific embodiments of the groups $R^3$ and $R^5$ are set forth hereinabove where corresponding groups in the compound (I) are described. $R^9$ is H or hydrocarbyl, preferably H or lower alkyl.

Examples of carboxylic reactants (B) are glyoxylic acid, and other omegaoxoalkanoic acids, keto alkanoic acids such as pyruvic acid, levulinic acid, ketovaleric acids, ketobutyric acids and numerous others. The skilled worker, having the disclosure before him, will readily recognize the appropriate compound of formula (V) to employ as a reactant to generate a given intermediate. Preferred compounds of formula (V) are those that will lead to preferred compounds of formula (I).

Reactant (B) may be a compound of the formula

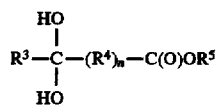

wherein each of $R^3$ and $R^5$ is independently H or alkyl. Such compounds arise when the carbonyl reactant is hydrated. Glyoxylic acid monohydrate is a representative example.

The intermediate arising from the reaction of (A) and (B) may be a carboxylic acid or a lactone. Often, the intermediate arising from the reaction of (A) and (B) is a mixture comprising both lactone and carboxylic acid. ps (C) Ammonia, Hydrazine and Amine Reactants Suitable (C) reactants, as defined herein, include ammonia, hydrazines, monoamines or polyamines. The (C) reactants must contain at least one N—H group. The monoamines generally contain from 1 to about 24 carbon atoms, preferably 1 to about 12, and more preferably 1 to about 6. Examples of monoamines useful in the present invention include primary amines, for example methylamine, ethylamine, propylamine, butylamine, octylamine, and dodecylamine. Examples of secondary amines include dimethylamine, diethylamine, dipropylamine, dibutylamine, methylbutylamine, ethylhexylamine, etc. Tertiary monoamines will not result in formation of an amide.

In another embodiment, the monoamine may be a hydroxyamine. Typically, the hydroxyamines are primary or secondary alkanolamines or mixtures thereof. As stated above, tertiary monoamines will not react to form amides; however tertiary alkanol monoamines sometimes can react to form a tertiary amino group containing ester. Alkanol amines that can react to form amide can be represented, for example, by the formulae:

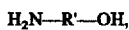

and

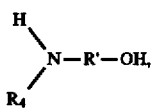

wherein each $R_4$ is independently a hydrocarbyl group of one to about 22 carbon atoms or hydroxyhydrocarbyl group of two to about 22 carbon atoms, preferably one to about four, and R' is a divalent hydrocarbyl group of about two to about 18 carbon atoms, preferably two to about four. The group —R'—OH in such formulae represents the hydroxyhydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. When two $R^4$ groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each $R^4$ is independently a methyl, ethyl, propyl, butyl, pentyl or hexyl group.

Examples of these alkanolamines include mono-, di-, and triethanolamine, diethylethanolamine, ethylethanolamine, butyldiethanolamine, etc.

The hydroxyamines can also be ether N-(hydroxyhydrocarbyl) amines. These are hydroxy poly (hydrocarbyloxy) analogs of the above-described hydroxy amines (these analogs also include hydroxyl-substituted oxyalkylene analogs). Such N-(hydroxyhydrocarbyl) amines can be conveniently prepared, for example, by reaction of epoxides with aforedescribed amines and can be represented by the formulae:

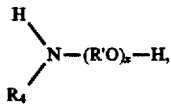

and

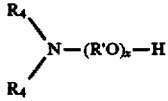

wherein x is a number from about 2 to about 15 and $R_4$ and R' are as described above. $R_4$ may also be a hydroxypoly (hydrocarbyloxy) group.

Other useful amines include ether amines of the general formula

wherein $R_6$ is a hydrocarbyl group, preferably an aliphatic group, more preferably an alkyl group, containing from 1 to about 24 carbon atoms, $R^1$ is a divalent hydrocarbyl group, preferably an alkylene group, containing from two to about 18 carbon atoms, more preferably two to about 4 carbon atoms and $R_7$ is H or hydrocarbyl, preferably H or aliphatic, more preferably H or alkyl, more preferably H. When $R_7$ is not H, then it preferably is alkyl containing from one to about 24 carbon atoms. Especially preferred ether amines are those available under the name SURFAM produced and marketed by Sea Land Chemical Co., Westlake, Ohio.

The amine may also be a polyamine. The polyamine may be aliphatic, cycloaliphatic, heterocyclic or aromatic. Examples of the polyamines include alkylene polyamines, hydroxy containing polyamines, arylpolyamines, and heterocyclic polyamines.

Alkylene polyamines are represented by the formula

wherein n has an average value between about 1 and about 10, preferably about 2 to about 7, more preferably about 2 to about 5, and the "Alkylene" group has from 1 to about 10 carbon atoms, preferably about 2 to about 6, more preferably about 2 to about 4. $R_5$ is independently hydrogen or an aliphatic or hydroxy-substituted aliphatic group of up to about 30 carbon atoms. Preferably $R_5$ is H or lower alkyl, most preferably, H.

Alkylene polyamines include methylene polyamines, ethylene polyamines, butylene polyamines, propylene polyamines, pentylene polyamines, etc. Higher homologs and related heterocyclic amines such as piperazines and N-amino alkyl-substituted piperazines are also included. Specific examples of such polyamines are ethylene diamine, diethylene triamine, triethylene tetramine, tris-(2-aminoethyl)amine, propylene diamine, trimethylene diamine, tripropylene tetramine, tetraethylene pentamine, hexaethylene heptamine, pentaethylenehexamine, dimethylaminopropylamine, etc.

Higher homologs obtained by condensing two or more of the above-noted alkylene amines are similarly useful as are mixtures of two or more of the aforedescribed polyamines.

Ethylene polyamines, such as some of those mentioned above, are preferred. They are described in detail under the heading Ethylene Amines in Kirk Othmer's "Encyclopedia of Chemical Technology", 2d Edition, Vol. 7, pages 22–37, Interscience Publishers, New York (1965). Such polyamines are most conveniently prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as the aforedescribed piperazines. Ethylene polyamine mixtures are useful.

Other useful types of polyamine mixtures are those resulting from stripping of the above-described polyamine mixtures to leave as residue what is often termed "polyamine bottoms". In general, alkylene polyamine bottoms can be characterized as having less than two, usually less than 1% (by weight) material boiling below about 200° C. A typical sample of such ethylene polyamine bottoms obtained from the Dow Chemical Company of Freeport, Tex., designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably diethylenetriamine). 0.72% triethylenetetramine, 21.74% tetraethylene pentaamine and 76.61% pentaethylene hexamine and higher by weight). These alkylene polyamine bottoms include cyclic condensation products such as piperazine and higher analogs of diethylenetriamine, triethylenetetramine and the like.

Another useful polyamine is a condensation product obtained by reaction of at least one hydroxy compound with at least one polyamine reactant containing at least one primary or secondary amino group. The hydroxy compounds are preferably polyhydric alcohols and amines. Preferably the hydroxy compounds are polyhydric amines. Polyhydric amines include any of the above-described monoamines reacted with an alkylene oxide (e.g., ethylene oxide, propylene oxide, butylene oxide, etc.) having two to about 20 carbon atoms, preferably two to about four. Examples of polyhydric mines include tri-(hydroxypropyl) amine, tris-(hydroxymethyl)amino methane, 2-amino-2-methyl-1,3-propanediol, N,N,N',N'-tetrakis(2-hydroxypropyl) ethylenediamine, and N,N,N',N'-tetrakis(2-hydroxyethyl) ethylenediamine.

Polyamine reactants, which react with the polyhydric alcohol or amine to form the condensation products or condensed amines, are described above. Preferred polyamine reactants include triethylenetetramine (TETA), tetraethylenepentamine (TEPA), pentaethylenehexamine (PEHA), and mixtures of polyamines such as the above-described "amine bottoms".

The condensation reaction of the polyamine reactant with the hydroxy compound is conducted at an elevated temperature, usually about 60° C. to about 265° C. in the presence of an acid catalyst.

The amine condensates and methods of making the same are described in Steckel (U.S. Pat. No. 5,053,152) which is incorporated by reference for its disclosure to the condensates and methods of making.

In another embodiment, the polyamines are hydroxy-containing polyamines. Hydroxy-containing polyamine analogs of hydroxy monoamines, particularly alkoxylated alkylenepolyamines can also be used. Such polyamines can be made by reacting the above-described alkylene amines with one or more of the above-described alkylene oxides. Similar alkylene oxide-alkanolamine reaction products can also be used such as the products made by reacting the afore-described primary, secondary or tertiary alkanolamines with ethylene, propylene or higher epoxides in a 1.1 to 1.2 molar ratio. Reactant ratios and temperatures for carrying out such reactions are known to those skilled in the art.

Specific examples of alkoxylated alkylenepolyamines include N-(2-hydroxyethyl) ethylenediamine, N,N-di-(2-hydroxyethyl)-ethylenediamine, 1-(2-hydroxyethyl) piperazine, mono-(hydroxypropyl)-substituted tetraethylenepentamine. N-(3-hydroxybutyl)-tetramethylene diamine, etc. Higher homologs obtained by condensation of the above illustrated hydroxy-containing polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

In another embodiment, the polyamine may be a heterocyclic polyamine. The heterocyclic polyamines include aziridines, azetidines, azolidines, tetra- and dihydropyridines, pyrroles, indoles, piperidines, imidazoles. di- and tetrahydroimidazoles, piperazines, isoindoles, purines, N-aminoalkylmorpholines. N-aminoalkylthiomorpholines, N-aminoalkylpiperazines, N,N'-bisaminoalkyl piperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, or nitrogen with oxygen and/or sulfur in the hetero ring, especially the piperidines, piperazines, thiomorpholines, morpholines, pyrrolidines, and the like. Piperidine, aminoalkylsubstituted piperidines, piperazine.

aminoalkylsubstituted piperazines, for example, aminoethylpiperazine, morpholine. aminoalkylsubstituted morpholines, pyrrolidine, and aminoalkyl-substituted pyrrolidines, are especially preferred. Usually the aminoalkyl substituents are substituted on a nitrogen atom forming part of the hereto ring. Specific examples of such heterocyclic amines include N-aminopropylmorpholine, N-aminoethylpiperazine, and N,N'-diaminoethylpiperazine. Hydroxy alkyl substituted heterocyclic polyamines are also useful. Examples include N-hydroxyethylpiperazine and the like.

In another embodiment, the amine is a polyalkene-substituted amine. These polyalkene-substituted amines are well known to those skilled in the art. They are disclosed in U.S. Pat. Nos. 3,275,554; 3,438,757; 3,454,555; 3,565,804; 3,755,433; and 3,822,289. These patents are hereby incorporated by reference for their disclosure of polyalkene-substituted amines and methods of making the same.

Typically, polyalkene-substituted amines are prepared by reacting halogenated-, preferably chlorinated-, olefins and olefin polymers (polyalkenes) with amines (mono- or polyamines). The amines may be any of the amines described above. Examples of these compounds include poly(propylene)amine; N,N-dimethyl-N-poly (ethylene/propylene)amine, (50:50 mole ratio of monomers); polybutene amine; N,N-di(hydroxyethyl)-N-polybutene amine; N-(2-hydroxypropyl)-N-polybutene amine; N-polybutene-aniline; N-polybutenemorpholine; N-poly(butene) ethylenediamine; N-poly(propylene)trimethylenediamine; N-polybutene)diethylene-triamine; N',N'-polybutene) tetraethylenepentamine; N,N-dimethyl-N'-poly(propylene)-1,3-propylenediamine and the like.

The polyalkene substituted amine is characterized as containing from at least about 8 carbon atoms, preferably at least about 30, more preferably at least about 35 up to about 300 carbon atoms, preferably 200, more preferably 100. In one embodiment, the polyalkene substituted amine is characterized by an n (number average molecular weight) value of at least about 500. Generally, the polyalkene substituted amine is characterized by an n value of about 500 to about 5000. preferably about 800 to about 2500. In another embodiment n varies between about 500 to about 1200 or 1300.

The polyalkenes from which the polyalkene substituted amines are derived include homopolymers and interpolymers of polymerizable olefin monomers of 2 to about 16 carbon atoms; usually 2 to about 6, preferably 2 to about 4, more preferably 4. The olefins may be monoolefins such as ethylene, propylene, 1-butene, isobutene, and 1-octene; or a polyolefinic monomer, preferably diolefinic monomer, such as 1,3-butadiene and isoprene. Preferably, the polymer is a homopolymer. An example of a preferred homopolymer is a polybutene, preferably a polybutene in which about 50% of the polymer is derived from isobutylene. The polyalkenes are prepared by conventional procedures.

It is generally preferred to utilize sufficient amine reactant (C) to convert substantially all of the intermediate arising from reaction of (A) with (B) to amide; however, conversion of at least 50%, more preferably 75% is often acceptable. Preferably, at least 90%, more preferably 99–100% conversion is effected.

The reaction with the (C) reactant to prepare the products of this invention is conducted at temperatures ranging from about 25° C. to about 230° C. When the amine is an alkanolamine, an alkylene polyamine or a thioalkanol amine, N-containing heterocyclic compounds such as imidazoline, oxazoline, or thiazoline formation may occur.

These are frequently obtained by first preparing the amide then continuing the reaction at elevated temperature to generate imidazoline, thiazoline or oxazoline by removal of water.

Imidazoline formation will not occur with every amine; the amine must have the structural element:

Similarly, oxazoline formation can take place when the amine is a β-hydroxyethyl amine, e.g.,

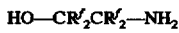

β-thiolamines can react to form thiazolines.

In the above formulae, each $R'$ is independently H, alkoxyalkyl, hydroxyalkyl, hydrocarbyl, aminohydrocarbyl or N-alkoxyalkyl- or hydroxyalkyl- substituted amino hydrocarbyl.

Thus, if imidazoline, thiazoline or oxazoline formation is not desired, they may be avoided by employing amine reactants that do not provide the opportunity for imidazoline, thiazoline or oxazoline formation, or, if the amine employed can lead to oxazoline, thiazoline or imidazoline, to minimize formation thereof by conducting the reaction at the lowest temperature to prepare amide at an acceptable rate and in acceptable amounts, or to avoid prolonged heating of the amide-containing product, once it has formed. Infrared analysis during the reaction is a convenient means for determining the nature and extent of the reaction.

A mole of any of (C) is its formula weight, for example, 17.03 for ammonia, 60.10 for ethylene diamine, and 189.31 for tetraethylenepentamine. The equivalent weights of these are 17.03, 30.05 and 37.86, respectively, each determined by dividing the formula weight by the number of nitrogen atoms having at least one H bonded thereto. Thus the equivalent weight of (C) is its formula weight divided by the number of nitrogen atoms per molecule having at least one H atom bonded thereto.

From the foregoing, it is apparent that the various 'R' groups in the product (I) correspond to or are derived from corresponding groups in the olefinic and carboxylic reactants.

The first step of the process of this invention is conducted at temperatures ranging from ambient up to the lowest decomposition temperature of any of the reactants, usually from about 60° C. to about 220° C., more often from about 120° C. to about 180° C., preferably up to about 160° C. The process employs from about 0.6 moles (B) per mole of (A) to 1.5 moles (B) per equivalent of (A), more often from about 0.8 moles (B) per mole of (A) to about 1.2 moles (B) per equivalent of (A), even more often from about 0.95 moles (B) per mole of (A) to about 1.05 moles (B) per equivalent of (A). The product formed in this first step is then reacted, at temperatures ranging from about 25° C. to about 230° C., preferably from about 60° C. to about 150° C., more often from about 100° C. to about 110° C. with (C) ammonia, a hydrazine or an amine characterized by the presence within its structure of at least one N—H group. Reactant (C) is used in amounts ranging from about 0.5 equivalents up to about 2 moles, per mole of (B).

Products obtained by post-treating the acylated nitrogen compounds of this invention are also useful. Reagents such as urea, thiourea, carbon disulfide, aldehydes, ketones, carboxylic acids, hydrocarbon substituted succinic anhydrides, nitriles, epoxides, boron compounds, phosphorus compounds and the like are useful post-treating agents.

The following examples are intended to illustrate several compositions of this invention as well as means for preparing same. Unless indicated otherwise all parts are parts by weight, filtrations are conducted employing a diatomaceous earth filter aid, and analytical values are by actual analysis. Aromatic hydrocarbons are commercial aromatic hydrocarbon solvents having a flash point of about 43° C. It is to be understood that these examples are intended to illustrate several compositions and procedures of the invention and are not intended to limit the scope of the invention.

EXAMPLE 1

Part A

A reactor is charged with 3000 parts of a polyisobutene having a number average molecular weight of about 1000 and which contains about 80 mole % terminal vinylidene groups and 6 parts 70% aqueous methanesulfonic acid. The materials are heated to 160° C. under $N_2$ followed by addition of 577.2 parts 50% aqueous glyoxylic acid over 4 hours while maintaining 155–160° C. Water is removed and is collected in a Dean-Stark trap. The reaction is held at 160° C. for 5 hours, cooled to 140° C. and filtered. The filtrate has total acid no. (ASTM Procedure D-974)=34.7 and saponification no. (ASTM Procedure D-74)=53.2. $\overline{M}_n$ (Gel permeation chromatography (GPC)) =1476 and $\overline{M}_w$ (GPC)=3067; unreacted polyisobutene (Thin layer chromatography-Flame ionization detector (TLC-FID))=8.6%.

Part B

A reactor is charged with 350 parts of the product of Part A of Example 1, 17.2 parts diethylene triamine and 267.5 parts mineral oil diluent, heated under $N_2$ to 160° C. and held at 160° C. for 5 hours. Filtered 145° C. Filtrate contains 1.02% N.

EXAMPLE 2

A reactor is charged with 250 parts of the product of Part A of Example 1 and 29 parts aminoethylpiperazine, heated to 160° C. and held at 160° C for 6 hour, then stripped to 160° C. and 25 millimeters (mm) Hg. The residue is mixed with 93 parts of aromatic hydrocarbon diluent. The product contains 2.19 % N and 0.23% free amine.

EXAMPLE 3

A reactor is charged with 350 parts of the product of Part A of Example 1, 20.4 parts of an ethylene polyamine mixture containing, on average, 34% N, and 246.9 parts mineral oil. The materials are mixed whole heating, under $N_2$, to 160° C. and held at 160° C. for 6 hours. The solution is filtered at 140° C. The filtrate contains 1.19% N.

EXAMPLE 4

Following essentially the procedure of Example 3, 350 parts of the product of Part A of Example 1, 21.6 parts of an ethylene polyamine bottoms having an equivalent weight of 42 based on % N and 247.7 parts mineral oil diluent are heated and filtered. The filtrate contains 1.21 % N.

EXAMPLE 5

A reactor is charged with 425 parts of an intermediate product prepared essentially according to the procedure of Part A of Example 1 and 40.8 parts ethylene diamine. The materials are mixed while heating, under $N_2$, to 135°, are held at temperature for 6 hours, stripped to 130° C. at 35 mm Hg, cooled to 100° C., then mixed with 150.7 parts aromatic hydrocarbon solvent. The solution contains 1.28% N and 0.20% free amine.

EXAMPLE 6

A reactor is charged with 300 parts of the intermediate product of Example 5, 9.7 parts of the ethylene polyamine bottoms of Example 4 and 206.5 parts of mineral oil diluent. The materials are mixed and heated, under $N_2$, to 160° C. and held at temperature for 6 hours, then filtered at 140° C. The filtrate contains 0.66% N.

EXAMPLE 7

A reactor is charged with 200 parts of the intermediate product of Example 5, 1.6 parts pentaerythritol and 211.6 parts mineral oil diluent, heated to 160° with stirring, under $N_2$, and held at temperature for 6 hours. A small amount of ester is detected. Methane sulfonic acid (1.2 parts) is added and the reaction is heated to 180° C., holding at temperature for 6 hours. Filtered at 120° C. Total acid No=4.6; infrared: 1780 $cm^{-1}$, 1740 $cm^{31\ 1}$. To another reactor are charged 275 parts of the above product and 5 parts of the ethylene polyamine bottoms of Example 4. The materials are heated and mixed, under $N_2$, to 160° C., held at temperature for 6 hours, then filtered at 130° C. The filtrate contains 0.75% N.

EXAMPLE 8

A reactor is charged with 250 parts of an intermediate prepared essentially according to the procedure of Part A of Example 1, 18.6 parts of the ethylene polyamine bottoms of Example 4 and 179 parts of mineral oil diluent. The materials are heated to 160° C., under $N_2$, held at temperature for 6 hours the filtered at 140° C. The filtrate contains 1.38% N.

EXAMPLE 9

A reactor is charged with 300 parts of the intermediate of Example 8 and 34.1 parts of aminoethylpiperazine. The materials are mixed while heating, under $N_2$, to 160° C. and are held at temperature for 5 hours, stripped to 160° C. and 35 mm Hg, cooled to 100° C., mixed with 143.2 parts aromatic hydrocarbon and filtered. The filtrate contains 2.06% N and 0.28% free amine.

EXAMPLE 10

A reactor is charged with 300 parts of the intermediate of Example 8 and 26.95 parts N,N-dimethylaminopropyl amine. The materials are mixed while heating, under $N_2$, to 160° C., held at temperature for 5 hours, stripped to 160° C. and 35 mm Hg, cooled to 100° C., mixed with 140.1 parts aromatic hydrocarbon diluent and is filtered. The filtrate contains 1.28% N and 0.28% free amine.

EXAMPLE 11

A reactor is charged with 150 parts of an intermediate prepared essentially according to the procedure of Part A of Example 1 and 9.24 parts aminoethylpiperazine. The materials are mixed while heating, under $N_2$, to 160° C. and are held at temperature for 5 hours, stripped to 160° C. and 25 mm Hg, cooled to 130° C., mixed with 53.1 parts aromatic hydrocarbon diluent and the solution is filtered. The filtrate contains 1.44% N.

EXAMPLE 12

The procedure of Example 11 is repeated except 13.9 parts aminoethyl piperazine is employed and the maximum reaction temperature is 180° C. The filtrate contains 1.96% N.

EXAMPLE 13A

The procedure of Example 12 is repeated employing 250 parts of the intermediate of Example 11, 24.6 parts diethylene triamine and 91.5 parts of aromatic hydrocarbon diluent. The product contains 2.23 % N.

EXAMPLE 13B

The procedure of Example 13A is repeated except the reaction is conducted at 200° C. The filtrate contains 1.94% N.

EXAMPLE 13C

The procedure of Example 13A is repeated except the reaction temperature is 160° C. The filtrate contains 2.01% N.

EXAMPLE 14

A reactor is charged with 600 parts of an intermediate prepared essentially according to the procedure of Part A of Example 1, 68.2 parts N,N-dimethylaminopropylamine, and 286.4 parts mineral oil. The materials are mixed while heating, under $N_2$, to 160° C., are held at temperature for 6 hours, stripped to 160° C. and 25 mm Hg, and filtered. The filtrate contains 1.18% N.

EXAMPLE 15

A reactor is charged with 300 parts of the intermediate of Example 14, 40.9 parts of aminoethylpiperazine and 150 parts 2-ethyl hexanol. The materials are mixed while heating, under $N_2$, to 160° C. and are held at temperature for 5 hours. stripped to 160° C. and 25 mm Hg, cooled to 100° C. whereupon 146.1 parts aromatic hydrocarbon diluent are added and the solution is filtered. The filtrate contains 2.14% N and 0.50% free amine.

EXAMPLE 16

A reactor is charged with 1200 parts of the polybutene of Part A of Example A, 2.4 parts 70% aqueous methane-sulfonic acid and 0.1 parts of a silicone antifoam agent. The materials are heated, under $N_2$, to 150° C. whereupon 213.1 parts 50% aqueous glyoxylic acid are added dropwise over 1.5 hours. collecting water in a Dean-Stark trap. Heating is continued for 3 hours at 150° C., whereupon 139.3 parts aminoethylpiperazine are added over 8 minutes, while temperature rises exothermically to 153° C. The materials are heated at 150° C. for 3 hours, cooled to 100° C. The materials are mixed with 139.3 parts of aromatic hydrocarbon diluent and filtered. The filtrate contains 1.88% N.

EXAMPLE 17

Part A

A reactor is charged with 1639 parts of a polyisobutene having a $\overline{M}_n$ about 1000 and containing about 50 mole % terminal vinylidene groups and 150.8 parts glyoxylic acid monohydrate. The materials are heated, under $N_2$, to 150° C. and are held at temperature for 4 hour, collecting 40 parts aqueous distillate during the first 2.25 hours and a total of 43 parts (about 1 part organic) after 4 hours. The materials are filtered at 140° C. The filtrate contains (by TLC-FID) 39.8% unreacted polyisobutene, has total acid no=16.1 and saponification no=54.8.

Part B

A reactor is charged with 250 parts of the product of Part A and 24.9 parts of N,N-$Me_2$ aminopropyl amine, heated under $N_2$ to 200° C. and held at temperature for 6.5 hours. The materials are cooled to 120° C. and stripped to 120° C. and 20 mm Hg the filtrate is diluted with 91.1 parts aromatic hydrocarbon solvent and filtered at 120° C. The solution contains 1.4% N.

EXAMPLE 18
Part A

A reactor is charged with 450 parts polybutene having $\overline{M}_n$, about 2400 and containing about 80 mole % terminal vinylidene groups and 2 parts 70% aqueous methane sulfonic acid. The materials are mixed while heating, under $N_2$, to 160° C. followed by dropwise addition of 44.4 parts 50% aqueous glyoxylic acid over 0.3 hours. The reaction mixture is held at 160° C. for a total of 6 hours, diluted with 318.3 parts mineral oil diluent and filtered at 140° C. The filtrate has (GPC) 65.9% $\overline{M}_n$=4712, $\overline{M}_w$=10681 and 34.1% $\overline{M}_n$=309, $\overline{M}_w$=410. Saponification No.=11.8, total acid no=11.7. Product contains 42% polybutene (TLC-FID).

Part B

A reactor is charged with 600 parts of the product of Part A, 7.95 parts of the polyamine bottoms of Example 4 and 5.3 parts mineral oil. The materials are mixed while heating, under $N_2$ to 160° C. and are held at temperature for 5 hours. The materials are cooled to 130° C. and filtered. The filtrate contains 0.52% N and 0% Cl.

EXAMPLE 19
Part A

A reactor is charged with 800 parts of a polybutene having $\overline{M}_n$=586 and containing about 80 mole % terminal vinylidene groups and 3 parts 70% aqueous methane sulfonic acid. The materials are mixed while heating, under $N_2$, to 150° C. followed by dropwise addition of 262.7 parts 50% aqueous glyoxylic acid over 2 hours, collecting aqueous distillate in a Dean-Stark trap. The reaction mixture is held at 150° C. for a total of 6 hours and filtered at 145° C. The filtrate has total acid no=55.6 and saponification no=89.45. The product contains (TLC-FID) 7.2% unreacted polyisobutene.

Part B

A reactor is charged with 400 parts of the product of Part A and 78.2 parts of aminoethylpiperazine. The reactants are mixed while heating, under $N_2$, to 160° C., held at temperature for 6 hours, stripped to 160° C. 25 mm Hg, cooled to 120° C. and filtered. The filtrate contains 3.49% N.

EXAMPLE 20

A reactor is charged with 200 parts of the intermediate product of Part A of Example 19, 31.2 parts diethylene triamine and 57.8 parts mineral oil, 160° C. The materials are mixed while heating, under $N_2$, to 160° C., held at temperature for 5 hours, cooled to 140° C. and filtered. The filtrate contains 4.18% N.

EXAMPLE 21
Part A

A reactor is charged with 98 parts $C_{12}$ α-olefin and 63 parts glyoxylic acid monohydrate. The materials are mixed and heated at 180°–210° C. for 10 hours while collecting total of 36 parts distillate containing about 75% water. The residue is filtered at room temperature. The filtrate has saponification no=231. Infra red: strong C=O @1710 $cm^{-1}$ and 1780 $cm^{-1}$.

Part B

A reactor is charged with 55 parts of the product of Part A of this example, 7.4 parts ethylene diamine and 150 parts toluene. The materials are heated, under $N_2$, for 20 hours at 110° C.; infra red spectrum shows trace of lactone after 8 hours. Stripping is conducted under reduced pressure on a rotary evaporator. The residue contains 6.06% N.

EXAMPLE 22
Part A

A reactor equipped with stirrer, thermowell, subsurface inlet and Dean-Stark trap is charged with 300 parts polyisobutylene having a number average molecular weight of about 1000 and containing about 50 mole % of terminal vinylidene groups, 44 parts 50% aqueous glyoxylic acid and 1 part sulfuric acid. The materials are heated to 100° C. and are held at 100° C. for 1.5 hours while removing water under a slow $N_2$ purge. The materials are then heated to 125° C. and held at 125° C. for 2.5 hours then heated to 150° C. and held at 150° C. for 3 hours while continuing to remove water under a slow $N_2$ purge. The strong acid (neutralization number, bromphenol blue indicator) is neutralized by sodium hydroxide. At this point the materials contain (TLC-FID) 34.9% unreacted polyisobutylene. The materials are reheated to 110° C. and filtered through a diatomaceous earth filter aid. The filtrate has saponification no.=40 and total acid no.=12.0; $\overline{M}_n$=1486, $\overline{M}_w$=9133.

Part B

To another reactor is charged 150 parts of the product of Part A of this example which is heated to 95° C. under N, followed by addition of 3 parts diethylene triamine. The temperature is held at 95° C. for 1 hour, then increased to 150° C. The reaction is held at temperature for 5 hours then temperature is increased to 200° C. and held for 2 hours followed by addition of 7 parts diethylene triamine and heating for 1 more hour. The materials are cooled to 150° C. and held at that temperature for 3 hours, stripped to 150° C. at 30 mm Hg the filtered. The filtrate contains 1.94% N and 1% free amine.

EXAMPLE 23
Part A

A reactor equipped as in Example 22, Part A is charged with 300 parts polyisobutylene having a number average molecular weight of about 1000 and containing about 50 mole % of terminal vinylidene groups and 44 parts 50% aqueous glyoxylic acid. The materials are heated to 100° C. and are held at 100° C. for 1 hour while removing water under a slow $N_2$ purge. The materials are then heated to 125° C. and held at 125° C. for 2.5 hours during which 9 parts water are collected, then to 150° C. and held at 150° C. for 3 hours while continuing to remove water under a slow $N_2$ purge, collecting an additional 14 parts water. At this point the materials contain by analysis (TLC-FID) 35.7% unreacted polyisobutylene. The materials are allowed to cool, then are reheated to 150° C. stripped to 150° C. at 10 mm Hg and filtered. The filtrate has saponification no.=48 and total acid no.=14.2. $\overline{M}_n$=1408, $\overline{M}_w$=2428.

Part B

Another reactor is charged with 150 parts of the product of Part A of this example and 31.5 mineral oil diluent. The materials are mixed with heating, under $N_2$, to 90° C., 9.5 parts diethylene triamine are added, then the temperature is increased to 150° C. The reaction is held at temperature for 6 hours, stripped to 150° C. @ 20 mm Hg for 3 hours then filtered. The filtrate contains 1.42% N and 0% free amines.

EXAMPLE 24

A reactor charged with 150 parts of the intermediate of Example 11 and 11.1 parts of diethylenetriamine is heated to 160° C. held at temperature for 5 hours, then stripped to 160° C. at 25 mm Hg. The residue is cooled to 130° C., diluted with 53.7 parts aromatic hydrocarbon diluent and filtered. The solution contains 1.75% N.

EXAMPLE 25

A reactor is charged with 150 parts of an intermediate prepared essentially according to the procedure of Part A of Example 1 and 18.5 parts aminoethylpiperazine. The materials are mixed while heating, under $N_2$, to 160° C. and are held at temperature for 5 hours, stripped to 160° C. and 25 mm Hg, cooled to 130° C., 56.2 parts aromatic hydrocarbon diluent are added and the solution is filtered. The filtrate contains 2.57% N.

EXAMPLE 26

The procedure of Example 25 is repeated except the reaction is conducted at 200° C. and stripping at 190° C. The filtrate contains 2.34% N.

EXAMPLE 27

The process of Part A of Example 1 is repeated employing 0.1 mole % $AlCl_3$ catalyst, filtered by the process of Part B.

EXAMPLE 28

The process of Part A of Example 1 is repeated employing 0.1 mole % $FeCl_3$ catalyst, followed by the process of Part B.

EXAMPLE 29

The process of Part A of Example 1 is repeated employing 0.2 mole % $BF_3$ catalyst, followed by the process of Part B.

EXAMPLE 30

The process of Example 1 is repeated replacing glyoxylic acid with an equal molar amount of pyruvic acid.

EXAMPLE 31

The process of Example 1 is repeated replacing glyoxylic acid with an equal molar amount of levulinic acid.

EXAMPLE 32

A reactor is charged with 250 parts of the intermediate of Example 1-A. 22.1 parts of a branched polyamine derived from the condensation of tris-hydroxymethyl aminomethane with an ethylene polyamine, and 214.7 parts mineral oil. The materials are heated, under $N_2$, to 160° C. and are held at 160° C. for 6 hours, then filtered at 130° C. The filtrate contains 1.16%.

EXAMPLE 33

Part A

A reactor is charged with 1000 parts polyisobutylene having a number average molecular weight of about 1000, 207.2 parts 50% aqueous glyoxylic acid. 5 parts 70% aqueous methane sulfonic acid, 0.1 parts silicone antifoam agent and 300 parts cyclohexane. The reaction is heated to 105° C. under $N_2$ and is held there for 6 hours, under $N_2$, collecting water. The temperature is increased to 110° C. and held for 4 hours, collecting water. Cyclohexene is removed by heating at 110° C. for 2 hours. Strip to 120° C. at 25 mm Hg for 2 hours then filter with a diatomaceous earth filter aid. Filtrate shows 15.3% unreacted polyisobutylene (TLC-FID). Saponification no.=58.4.

Part B

A reactor is charged with 350 parts of the product of Part A of this Example and 42.3 parts N-aminoethylpiperazine. The materials are heated, under $N_2$, to 170° C. and are held at 170° C. for a total of 8 hours, then stripped to 170° C. at 25 mm Hg for 1 hour. To the residue are added 168.1 parts aromatic hydrocarbon, the materials are mixed then filtered. The filtrate contains 1.66% N.

EXAMPLE 34

The product of Example 1, Part B is post treated with 1% by weight $H_3BO_3$ at 130° C., removing aqueous distillate as it forms.

The Lubricating Oil Compositions

The Oil of Lubricating Viscosity

In one embodiment of this invention, the compositions are lubricating oil compositions. The lubricating compositions employ an oil of lubricating viscosity. including natural or synthetic lubricating oils and mixtures thereof. Mixtures of mineral oil and synthetic oils, particularly polyalphaolefin oils and polyester oils, are often used.

Natural oils include animal oils and vegetable oils (e.g. castor oil, lard oil and other vegetable acid esters) as well as mineral lubricating oils such as liquid petroleum oils and solvent-treated or acid treated mineral lubricating oils of the paraffinic. naphthenic or mixed paraffinic-naphthenic types. Hydrotreated or hydrocracked oils are included within the scope of useful oils of lubricating viscosity.

Oils of lubricating viscosity derived from coal or shale are also useful. Synthetic lubricating oils include hydrocarbon oils and halosubstituted hydrocarbon oils such as polymerized and interpolymerized olefins, etc. and mixtures thereof, alkylbenzenes, polyphenyl, (e.g., biphenyls, terphenyls, alkylated polyphenyls, etc.). alkylated diphenyl ethers and alkylated diphenyl sulfides and their derivatives, analogs and homologues thereof and the like.

Alkylene oxide polymers and interpolymers and derivatives thereof, and those where terminal hydroxyl groups have been modified by esterification, etherification. etc., constitute other classes of known synthetic lubricating oils that can be used.

Another suitable class of synthetic lubricating oils that can be used comprises the esters of dicarboxylic acids and those made from $C_5$ to $C_{12}$ monocarboxylic acids and polyols or polyol ethers.

Other synthetic lubricating oils include liquid esters of phosphorus-containing acids, polymeric tetrahydrofurans and the like, silicon-based oils such as the o polyalkyl-, polyaryl-, polyalkoxy-, or polyaryloxy-siloxane oils and silicate oils.

Hydrotreated naphthenic oils are well known.

Unrefined, refined and rerefined oils, either natural or synthetic (as well as mixtures of two or more of any of these) of the type disclosed hereinabove can used in the compositions of the present invention. Unrefined oils are those obtained directly from a natural or synthetic source without further purification treatment. Refined oils are similar to the unrefined oils except they have been further treated in one or more purification steps to improve one or more properties. Rerefined oils are obtained by processes similar to those used to obtain refined oils applied to refined oils which have been already used in service. Such rerefined oils often are additionally processed by techniques directed to removal of spent additives and oil breakdown products.

Specific examples of the above-described oils of lubricating viscosity are given in Chamberlin III, U.S. Pat. No. 4,326,972 and European Patent Publication 107,282, both of which are hereby incorporated by reference for relevant disclosures contained therein.

A basic, brief description of lubricant base oils appears in an article by D. V. Brock, "Lubrication Engineering", Volume 43, pages 184–5, March, 1987, which article is expressly incorporated by reference for relevant disclosures contained therein.

Other Additives

The lubricating oil compositions of this invention may contain minor amounts of other components. The use of such components is optional and the presence thereof in the compositions of this invention will depend on the particular use and level of performance required. Thus these components may be included or excluded.

The compositions may comprise a zinc salt of a dithiophosphoric acid. Zinc salts of dithiophosphoric acids are often referred to as zinc dithiophosphates, zinc O,O-dihydrocarbyl dithiophosphates, and other commonly used names. They are sometimes referred to by the abbreviation ZDP. One or more zinc salts of dithiophosphoric acids may be present in a minor amount to provide additional extreme pressure, anti-wear and anti-oxidancy performance.

In addition to zinc salts of dithiophosphoric acids discussed hereinabove, other additives that may optionally be used in the lubricating oils of this invention include, for example, detergents, dispersants, viscosity improvers, oxidation inhibiting agents, metal passivating agents, pour point depressing agents, extreme pressure agents, anti-wear agents, color stabilizers and anti-foam agents. The above-mentioned dispersants and viscosity improvers are used in addition to the additives of this invention.

Auxiliary extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbon and trihydrocarbon phosphites, molybdenum compounds, and the like.

Viscosity improvers (also sometimes referred to as viscosity index improvers) may be included in the compositions of this invention. Viscosity improvers are usually polymers, including polyisobutenes, polymethacrylic acid esters, diene polymers, polyalkyl styrenes, alkenylarene-conjugated diene copolymers and polyolefins. Multifunctional viscosity improvers, other than those of the present invention, which also have dispersant and/or antioxidancy properties are known and may optionally be used in addition to the products of this invention. Such products are described in numerous publications including those mentioned in the Background of the Invention. Each of these publications is hereby expressly incorporated by reference.

Pour point depressants are a particularly useful type of additive often included in the lubricating oils described herein. See for example, page 8 of "Lubricant Additives" by C. V. Smalheer and R. Kennedy Smith (Lezius-Hiles Company Publisher, Cleveland, Ohio, 1967). Pour point depressants useful for the purpose of this invention, techniques for their preparation and their use are described in U.S. Pat. Nos. 2,387,501; 2,015,748; 2,655,479; 1,815,022; 2,191,498; 2,666,748; 2,721,877; 2,721,878; and 3,250,715 which are expressly incorporated by reference for their relevant disclosures.

Anti-foam agents used to reduce or prevent the formation of stable foam include silicones or organic polymers. Examples of these and additional anti-foam compositions are described in "Foam Control Agents", by Henry T. Kerner (Noyes Data Corporation, 1976), pages 125–162.

Detergents and dispersants may be of the ash-producing or ashless type. The ash-producing detergents are exemplified by oil soluble neutral and basic salts of alkali or alkaline earth metals with sulfonic acids, carboxylic acids, phenols or organic phosphorus acids characterized by at least one direct carbon-to-phosphorus linkage.

The term "basic salt" is used to designate metal salts wherein the metal is present in stoichiometrically larger amounts than the organic acid radical. Basic salts and techniques for preparing and using them are well known to those skilled in the art and need not be discussed in detail here.

Ashless detergents and dispersants are so-called despite the fact that, depending on its constitution, the detergent or dispersant may upon combustion yield a nonvolatile residue such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent number 1,306,529 and in many U.S. patents including the following:

| 3,163,603 | 3,381,022 | 3,542,680 |
| 3,184,474 | 3,399,141 | 3,567,637 |
| 3,215,707 | 3,415,750 | 3,574,101 |
| 3,219,666 | 3,433,744 | 3,576,743 |
| 3,271,310 | 3,444,170 | 3,630,904 |
| 3,272,746 | 3,448,048 | 3,632,510 |
| 3,281,357 | 3,448,049 | 3,632,511 |
| 3,306,908 | 3,451,933 | 3,697,428 |
| 3,311,558 | 3,454,607 | 3,725,441 |
| 3,316,177 | 3,467,668 | 4,194,886 |
| 3,340,281 | 3,501,405 | 4,234,435 |
| 3,341,542 | 3,522,179 | 4,491,527 |
| 3,346,493 | 3,541,012 | RE 26,433 |
| 3,351,552 | 3,541,678 | |

(2) Reaction products of relatively high molecular weight aliphatic or alicyclic halides with amines, preferably polyalkylene polyamines. These may be characterized as "amine dispersants" and examples thereof are described for example, in the following U.S. patents:

| 3,275,554 | 3,454,555 |
| 3,438,757 | 3,565,804 |

(3) Reaction products of alkyl phenols in which the alkyl groups contains at least about 30 carbon atoms with aldehydes (especially formaldehyde) and amines (especially polyalkylene polyamines), which may be characterized as "Mannich dispersants". The materials described in the following U.S. patents are illustrative:

| 3,413,347 | 3,725,480 |
| 3,697,574 | 3,726,882 |
| 3,725,277 | |

(4) Products obtained by post-treating the carboxylic amine or Mannich dispersants with such reagents are urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |
| | | | 4,234,435 |

(5) Interpolymers of oil-solubilizing monomers such as decyl methacrylate, vinyl decyl ether and high molecular weight olefins with monomers containing polar substituents, e.g., aminoalkyl acrylates or methacrylates, acrylamides and poly-(oxyethylene)-substituted acrylates. These may be characterized as "polymeric dispersants" and examples thereof are disclosed in the following U.S. patents:

| | |
|---|---|
| 3,329,658 | 3,666,730 |
| 3,449,250 | 3,687,849 |
| 3,519,565 | 3,702,300 |

The above-noted patents are incorporated by reference herein for their disclosures of ashless dispersants.

The above-illustrated additives may each be present in lubricating compositions at a concentration of as little as 0.001% by weight usually ranging from about 0.01% to about 20% by weight, more often from about 1% to about 12% by weight.

The compositions of the present invention are present in a minor amounts, often amounts ranging from about 1% to about 20% by weight, more often from about 3% to about 10% by weight, even more often from about 5% to about 8% by weight.

Additive Concentrates

The various additives described herein can be added directly to the lubricating oil or fuel. Preferably, however, they are diluted with a substantially inert, normally liquid organic diluent such as mineral oil, naphtha, benzene, toluene or xylene, to form an additive concentrate. These concentrates usually comprise about 0.1 to about 80% by weight, frequently from about 1% to about 10% by weight, more often from about 10% to about 80% by weight, of the compositions of this invention and may contain, in addition, one or more other additives known in the an or described hereinabove. Concentrations such as 15%, 20%, 30% or 50% or higher may be employed.

Additive concentrates are prepared by mixing together, often at elevated temperature, the desired components.

Additive concentrates used for preparing lubricating oil compositions are illustrated by the following examples. The amounts shown are indicated as parts by weight or parts by volume. Unless indicated otherwise, components are indicated as parts or percentages by weight of chemical present on an oil or diluent free basis. When products of Examples set forth hereinabove are used, the amounts listed are as prepared, including diluent, if any.

Example I–IV

Additive concentrates are prepared by blending 6.7 parts of calcium overbased (MR~1.1) sulfur-coupled alkyl phenate, 8.6 parts of zinc mixed isopropyl-isooctyl (60/40 molar) dithiophosphate, 4.66 parts calcium overbased (Metal Ratio (MR)~2.3) sulfur-coupled alkyl phenate, 3.76 parts of calcium overbased (MR~1.2) alkylbenzene sulfonate, 3.06 parts magnesium overbased (MR ~14.7) alkylbenzene sulfonate, 1.93 parts di-(nonyl phenyl) amine, 0.1 parts of silicone antifoam, 8.69 parts of product obtained by reacting reaction polyisobutene ($\overline{M}_n$~1000) substituted succinic anhydride with ethylene polyamine then with pentaerythritol and 4.9 parts of the product of the indicated example:

| Example | I | II | III | IV | V |
|---|---|---|---|---|---|
| Product of Example | 4 | 1-B | 18 | 3 | 32 | and sufficient mineral oil to bring the total to 100 parts.

Example VI

An additive concentrate similar to that of Example I but containing 0.96 parts of di-(nonyl phenyl) amine.

Example VII

An additive concentrate similar to that of Example I replacing di-(nonyl phenyl) amine with mineral oil.

Example VIII

An additive concentrate is prepared by mixing together 9.7 parts of the reaction product of polyisobutylene ($\overline{M}_n$~1000) substituted succinic anhydride with an ethylene polyamine mixture containing about 34% N, 8.5 parts of the imidazoline derived from isostearic acid and ethylene polyamine, 1.2 parts di-(nonyl phenyl) amine, 62.78 parts of the product of Example 16 and sufficient mineral oil to bring the total to 100 parts.

Example IX

An additive concentrate is prepared by mixing together 2.79 parts of the borated reaction product derived from polyisobutylene ($\overline{M}_n$~1000) substituted succinic anhydride with an ethylene polyamine mixture containing about 34% N. 0.83 parts of dibutyl phosphite, 15.45 parts of styrene-mixed $C_{(8-10, 12-18)}$ maleate copolymer, 1.75 parts di-(nonyl phenyl) amine, 4.16 parts of dithiocarbamate derived from dibutyl dithiocarbamic acid and methyl acrylate, 6.25 parts of hydroxy propyl tertiary dodecyl sulfide, 29.2 parts of the product of Example 3 and sufficient mineral oil to bring the total to 100 parts.

Example X

An additive concentrate is prepared as in Example IX except 29.2 parts of the product of Example 3 are replaced with 29.2 parts of the product of Example 32.

The lubricating compositions of this invention are illustrated by the examples in the following Tables. The lubricating compositions are prepared by combining the specified ingredients, individually or from concentrates, in the indicated amounts and oil of lubricating viscosity to make the total 100 parts by weight. The amounts shown are indicated as parts by weight or parts by volume. Unless indicated otherwise, where components are indicated as parts by weight, they are amounts of chemical present on an oil or diluent free basis. Thus, for example, an additive comprising 50% oil used at 10% by weight in a blend, provides 5% by weight of chemical. Totals are 100% by weight or 100 parts by weight. However, when referring to incorporation of products of Examples set forth herein, amounts are as prepared.

Example A

A lubricating oil composition is prepared by mixing together a mineral oil of lubricating viscosity (Exxon ISO 46) and 0.1 parts of the product of Example 20.

Example B

A lubricating oil composition as in Example A except 0.5 of the product of Example 20.

Examples C-J

Lubricating oil compositions are prepared by mixing together in a mineral oil of lubricating viscosity (Exxon 15W-40), 7.5 parts of a 91% oil solution of an ethylene-propylene-diene copolymer, and the indicated amounts of the additive concentrates set forth in the following table:

| Example | Additive Concentrate/Parts by Weight |
|---|---|
| C | Example I/13.3 |
| D | Example II/13.3 |
| E | Example III/13.3 |
| F | Example IV/13.3 |
| G | Example VI/13.5 |
| H | Example VII/13.2 |
| J | Example V/13.3 |

Example K

A lubricating oil composition is prepared by mixing together in a mineral oil of lubricating viscosity (85% 600N and 15% Bright Stock) 0.15 parts of a polymethacrylate pour point depressant, and 13.5 parts of the additive concentrate of Example VIII.

Example L

A lubricating oil composition is prepared by mixing together in a mineral oil basestock (Exxon Dexron III basestock) 0.025 parts of red dye, 0.042 parts of a mixed silicone antifoam, and 12 parts of the additive concentrate of Example IX.

Example M

A lubricating oil composition is prepared as in Example L replacing the additive concentrate of Example IX with that of Example X.

The Fuel Compositions
The Normally Liquid Fuels

As indicated hereinabove, the products of this invention may also be used as additives for normally liquid fuels.

The fuels used in the fuel compositions of this invention are well known to those skilled in the art and usually contain a major portion of a normally liquid fuel such as hydrocarbonaceous petroleum distillate fuel (e.g., motor gasoline as defined by ASTM Specifications D-439-89 and D-4814-91 and diesel fuel or fuel oil as defined in ASTM Specifications D-396-90 and D-975-91). Fuels containing non-hydrocarbonaceous materials such a alcohols, ether, organonitro compounds and the like (e.g., methanol, ethanol, diethyl ether, methyl ethyl ether, nitromethane) are also within the scope of this invention as are liquid fuels derived from vegetable or mineral sources. Vegetable or mineral sources include, for example, crude petroleum oil, coal, corn, shale, oilseeds and other sources.

Oxygenates are compounds covering a range of alcohol and ether type compounds. They have been recognized as means for increasing octane value of a base fuel. They have also been used as the sole fuel component, but more often as a supplemental fuel used together with, for example, gasoline to form the well-known "gasohol" blend fuels. Oxygenate-containing fuels are described in ASTM D-4814-91.

Methanol and ethanol are commonly used oxygenates. They are primarily used as fuels. Other oxygenates, such as ethers, for example methyl-t-butyl ether, are more often used as octane number enhancers for gasoline.

Mixtures of fuels are useful. Examples of fuel mixtures are combinations of gasoline and ethanol, diesel fuel and ether, gasoline and nitromethane, etc.

Particularly preferred fuels are gasoline, that is, a mixture of hydrocarbons having an ASTM boiling point of 60° C. at the 10% distillation point to about 205° C. at the 90% distillation point, oxygenates, and gasoline-oxygenate blends, all as defined in the aforementioned ASTM Specifications for automotive gasolines. Most preferred is gasoline.

The fuel compositions of the present invention may contain other additives which are well known to those of skill in the art. These can include anti-knock agents such as tetra-alkyl lead compounds, lead scavengers such as haloalkanes, dyes, antioxidants such as hindered phenols, rust inhibitors such as alkylated succinic acids and anhydrides and derivatives thereof, bacteriostatic agents, auxiliary dispersants and detergents, gum inhibitors, fluidizers, metal deactivators, demulsifiers, anti-icing agents and the like. The fuel compositions of this invention may be lead-containing or lead-free fuels. Preferred are lead-free fuels.

The products of this invention provide a number of benefits to a treated fuel, including detergency, anticorrosion and the like.

In one particular embodiment of this invention, the motor fuel compositions contain an amount of additives sufficient to provide total intake system cleanliness. In another embodiment, they are used in amounts sufficient to prevent or reduce the formation of intake valve deposits or to remove them where they have formed.

As mentioned hereinabove, fluidizers may be used in the fuel compositions of the instant invention. Useful fluidizers include natural oils or synthetic oils, or mixtures thereof. Natural oils include mineral oils, vegetable oils, animal oils, and oils derived from coal or shale. Synthetic oils include hydrocarbon oils such as alkylated aromatic oils, olefin oligomers, esters, including esters of polycarboxylic acids, polyols, polyethers, poly(oxyalkylene) glycols, alkylphenol-derived polyethers, and others.

Fluidizers are usually fuel soluble, meaning they are soluble in the fuel in amounts of at least 0.1% by weight, more preferably at least 1% by weight. Certain fluidizers, for example, butylene- and propylene oxide derived fluidizers, are generally soluble in fuels at all levels. These are typically prepared from alcohol, glycol, and phenol initiators under superatmospheric pressure. Basic catalysts are preferred.

Especially preferred mineral oils are paraffinic oils containing no more than about 20% unsaturation, that is, no more than 20% of the carbon to carbon bonds are olefinic.

Particularly useful synthetic oils are the polyether oils such as those marketed under the UCON tradename by Union Carbide Corporation, poly(oxyalkylene) glycols such as those marketed under the EMKAROX tradename by ICI Chemicals and described in EP 0647700-A1 based on U.S. Ser. No. 133442 filed Oct. 6, 1993 and polyester oils derived from a polyol and one or more monocarboxylic acids such as those marketed by Halco Corporation.

Other examples are polyoxyalkylene compounds prepared from $C_{1-30}$ alcohols or $C_{7-24}$ alkylphenols and sufficient propylene- or butylene oxide such that molecular weight ranges from about 200 to about 5,000, and monoethers and N-vinylpyrrolidinone addition products thereof. Additional fluidizers include polyoxyalkylene compounds prepared from glycols or polyols having from 2 to about 10 carbon atoms and sufficient propylene- or butylene oxide such that overall molecular weight ranges from about 200 to about 6,000 and ether derivatives thereof.

Preferably, the fluidizers have a kinematic viscosity ranging from about 2 to about 25 centistokes at 100° C., preferably from about 4 to about 20 centistokes, and often up to about 15 centistokes. If the viscosity of the fluidizer is too high, a problem that may arise is the development of octane requirement increase (ORI) wherein the octane value demands of the engine tend to increase with time of operation.

While both mineral oils and synthetic oils are generally useful as fluidizers over the entire preferred viscosity range, it has been observed that at the lower end of the viscosity range, synthetic oils tend to provide somewhat superior performance compared to mineral oils.

It has been found that fluidizers, particularly when used within the ranges specified herein, together with the compositions of this invention, improve detergency, emissions, and reduce the tendency toward valve sticking. Amounts of the various additives, including individual amounts to be used in the fuel composition, and relative amounts of additives are given hereinafter.

The fuel compositions of this invention may contain auxiliary dispersants. A wide variety of dispersants are known in the art and may be used together with the amide compounds described herein. Preferred auxiliary dispersants are Mannich type dispersants, acylated nitrogen-containing dispersants, aminophenol dispersants, aminocarbamate dispersants, ester dispersants and amine dispersants.

Acylated nitrogen-containing compounds include reaction products of hydrocarbyl-substituted carboxylic acylating agents such as substituted carboxylic acids or derivatives thereof with ammonia or amines. Especially preferred are succinimide dispersants.

Acylated nitrogen-containing compounds are known in the art and are disclosed in, for example, U.S. Pat. Nos. 4,234,435; 3,215,707; 3,219,666; 3,231,587 and 3,172,892, which are hereby incorporated by reference for their disclosures of the compounds and the methods of preparation.

The auxiliary dispersant may also be an ester. These compounds are prepared by reacting a hydrocarbyl-substituted carboxylic acylating agent with at least one organic hydroxy compound. In another embodiment, the ester dispersant is prepared by reacting the acylating agent with a hydroxyamine. Preferred are succinic esters.

Carboxylic esters and methods of making the same are known in the art and are disclosed in U.S. Pat. Nos. 3,219,666, 3,381,022, 3,522,179 and 4,234,435 which are hereby incorporated by reference for their disclosures of the preparation of carboxylic ester dispersants.

The carboxylic esters may be further reacted with at least one amine and preferably at least one polyamine. These nitrogen-containing carboxylic ester dispersant compositions are known in the art, and the preparation of a number of these derivatives is described in, for example, U.S. Pat. Nos. 3,957,854 and 4,234,435 which have been incorporated by reference previously.

Also included among the auxiliary dispersants are Mannich type dispersants. Mannich products are formed by the reaction of at least one aldehyde, at least one amine having at least one N—H group and at least one hydroxyaromatic compound.

Mannich products are described in the following patents: U.S. Pat. No. 3,980,569; U.S. Pat. No. 3,877,899; and U.S. Pat. No. 4,454,059 (herein incorporated by reference for their disclosure to Mannich products).

The auxiliary dispersant may be a polyalkene-substituted amine. Polyalkene-substituted amines are well known to those skilled in the art. Typically, polyalkene-substituted amines are prepared by reacting olefins and olefin polymers (polyalkenes) and halogenated derivatives thereof with amines (mono- or polyamines). These amines are disclosed in U.S. Pat. No. 3,275,554; 3,438,757; 3,454,555; 3,565,804; 3,755,433; and 3,822,289. These patents are hereby incorporated by reference for their disclosure of hydrocarbyl amines and methods of making the same.

Aminophenols are also included among useful auxiliary dispersants that may be used in the fuel composition of this invention. Typically, such materials are prepared by reducing hydrocarbyl substituted nitrophenols to the corresponding aminophenol. Useful aminophenols include those described in Lange. U.S. Pat. Nos. 4,320,000 and 4,320,021. Aminophenols and methods for preparing are described in U.S. Pat. Nos. 4,100,082 and 4,200,545 to Clason et al. U.S. Pat. No. 4,379,065 (Lange) and U.S. Pat. No. 4,425,138 (Davis). It should be noted that the term "phenol" used in the context of aminophenols is not intended to limit the compounds referred to in that manner as being only hydroxybenzene derivatives. The term "phenol" is intended to encompass hydroxy aromatic compounds, including hydroxybenzene compounds, naphthols, catechols and others as described in the foregoing patents, all of which are incorporated herein by reference for relevant disclosures contained therein.

Also included among useful auxiliary dispersants are aminocarbamate dispersants such as those described in U.S. Pat. No. 4,288,612, which is incorporated herein by reference for relevant disclosures contained therein.

Treating levels of the additives used in this invention are often described in terms of pounds of additive per thousand barrels (PTB) of fuel. PTB values may be convened to approximate values expressed as parts (by weight) per million parts (by weight) of fuel by multiplying PTB by 4 for gasoline and by 3.3 for diesel oil and fuel oil. To determine precise values it is necessary that the specific gravity of the fuel is known. The skilled person can readily perform the necessary mathematical calculations.

The fuel compositions of this invention contain from about 5 to about 500 pounds per thousand barrels (PTB) of fuel additive, preferably from about 10 to about 250 PTB, more preferably from about 20 to about 100 PTB.

Fluidizers, when used, are generally present in amounts ranging from about 1 to about 500 PTB, more often from about 10 to about 250 PTB and most preferably from about 10 to about 150 PTB.

Relative amounts by weight, of the nitrogen-containing compound to fluidizer oil typically range from about 1:0 that is, essentially free of fluidizer, up to 1:10, more often from about 1:0.5–2:0, preferably from about 1:0.75–1.25.

Additive Concentrates

As mentioned hereinabove, the additives for use in fuels may be supplied as additive concentrates which are then diluted with normally liquid fuels. The following Table illustrates additive concentrates for use in fuels.

|  | Concentrate (% by Weight) | | | |
|---|---|---|---|---|
| Component | F-I | F-II | F-III | F-IV |
| Alkylated aromatic hydrocarbon[1] | 15.76 | 19.2 | 15.76 | 19.2 |
| Product of Example 9 |  |  | 33.38 | 38 |
| Product of Example 10 | 33.38 | 38 |  |  |
| Demulsifiers | 0.22 |  | 0.22 |  |
| Polyether Oil[2] |  | 42.8 |  | 42.8 |
| Propoxylated succinic acid |  |  |  |  |
| Mineral oil[3] | 45.94 |  | 45.94 | 21.37 |
| 2-Ethylhexanol | 4.54 |  | 4.54 |  |

[1] = HISOL-10, Ashland Chemical Co.
[2] = EMKAROX AF-20, ICI
[3] = 800N

The following examples illustrate several fuel compositions of this invention. When referring to compounds described in Examples 1–32, amounts are given in parts and percentages by weight as prepared. Unless indicated otherwise, all other parts and percentages are by weight and amounts of additives are expressed in amounts substantially free of mineral oil or hydrocarbon solvent diluent. The abbreviation 'PTB' means pounds of additive per thousand barrels of fuel.

The following illustrates several fuel compositions of the instant invention comprising unleaded gasoline and the indicated amounts of additive in percent by weight concentrate in fuel.

| GASOLINE + % WEIGHT ADDITIVE CONCENTRATE | | | | | |
|---|---|---|---|---|---|
|  | Example | | | | |
| Concentrate | F-A | F-B | F-C | F-D | F-E |
| F-I | 0.08 |  |  |  |  |
| F-II |  | 0.07 |  |  |  |
| F-III |  |  | 0.08 |  |  |
| F-IV |  |  |  | 0.0007 | 0.015 |

While the invention has been explained in relation to its preferred embodiments, it is to be understood that various modifications thereof will become apparent to those skilled in the an upon reading the specification. Therefore, it is to be understood that the invention disclosed herein is intended to cover such modifications that fall within the scope of the appended claims.

What is claimed is:

1. A composition comprising a compound of the formula

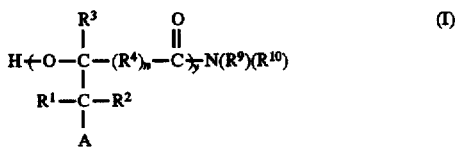

wherein each of $R^1$ and $R^2$ is H or a hydrocarbon based group, $R^3$ is H or hydrocarbyl;

$R^4$ is a divalent hydrocarbylene group;

n=0 or 1;

y is an integer ranging from 1 to about 200;

A is a hydrocarbyl group or a hydroxy-substituted hydrocarbyl group selected from groups of the formula

and

wherein z=0 or 1;

wherein X is a divalent hydrocarbyl group selected from the group consisting of

when z=0, and

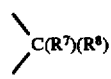

when z=1:

wherein each of $R^5$, $R^6$, $R^7$ and $R^8$ is independently H or a hydrocarbon based group; and each of $R^9$ and $R^{10}$ is independently H, alkoxyhydrocarbyl, hydroxyhydrocarbyl, hydrocarbyl, aminohydrocarbyl, N-alkoxyalkyl- or hydroxyalkyl-substituted aminohydrocarbyl, or a group of the formula —(Y—)$_a$R$^{11}$—B, wherein each Y is a group of the formula

or

each $R^{11}$ is a divalent hydrocarbyl group, $R^{12}$ is as defined above for $R^9$ and $R^{10}$, and B is H, hydrocarbyl, amino, hydroxyhydrocarbyl, an amide group, an amide-containing group, an acylamino group, an imide group, or an imide-containing group, and a is 0 or a number ranging from 1 to about 100, provided that no more than three $R^9$, $R^{10}$, and $R^{12}$ contain amide groups, imide-containing groups, acylamino groups or amide-containing groups; or $R^9$ and $R^{10}$ taken together with the adjacent N constitute a nitrogen-containing heterocyclic group, optionally further containing one or more additional heteroatoms selected from the group consisting of N, O and S; or one of $R^9$ and $R^{10}$ taken together with the adjacent N constitute a N—N group.

2. The composition of claim 1 wherein each of $R^1$, $R^2$ and $R^3$ is independently hydrogen or a lower alkyl or alkenyl group.

3. The composition of claim 1 wherein $R^4$ is an alkylene group containing from 1 to about 10 carbon atoms.

4. The composition of claim 1 wherein each of $R^1$, $R^2$ and $R^3$ is hydrogen and n=zero.

5. The composition of claim 1 wherein at least one of $R^6$, $R^7$ and $R^8$ is a hydrocarbyl group containing from 2 to about 5000 carbon atoms.

6. The composition of claim 1 wherein $R^6$ is an aliphatic group containing from about 10 to about 300 carbon atoms.

7. The composition of claim 6 wherein $R^6$ contains from 30 to about 100 carbon atoms and is derived from a polymer selected from the group consisting of homopolymerized and interpolymerized $C_{2-10}$ olefins.

8. The composition of claim 1 wherein at least one of $R^7$ and $R^8$ is an aliphatic group containing from about 10 to about 300 carbon atoms.

9. The composition of claim 8 wherein at least one of $R^7$ and $R^8$ contains from about 30 to about 100 carbon atoms and is derived from a polymer selected from the group consisting of homopolymerized and interpolymerized $C_{2-10}$ olefins.

10. The composition of claim 7 wherein the olefins are 1-olefins.

11. The composition of claim 9 wherein the olefins are 1-olefins.

12. The composition of claim 10 wherein the 1-olefins are ethylene, propylene, butenes, isobutylene, and mixtures thereof.

13. The composition of claim 11 wherein the 1-olefins are ethylene, propylene, butenes, isobutylene and mixtures thereof.

14. The composition of claim 1 wherein at least one of $R^7$ and $R^8$ is an aliphatic group containing from 8 to about 24 carbon atoms.

15. The composition of claim 1 wherein at least one of $R^7$ and $R^8$ contains from 12 to about 50 carbon atoms.

16. The composition of claim 1 wherein $R^6$ is an aliphatic group containing from 8 to about 24 carbon atoms.

17. The composition of claim 1 wherein $R^6$ contains from 12 to about 50 carbon atoms.

18. The composition of claim 1 wherein y ranges from 1 to about 30.

19. The composition of claim 1 wherein A is the group of formula

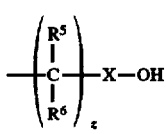

(III)

and z=0.

20. The composition of claim 1 wherein A is the group of formula

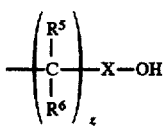

(III)

and z=1.

21. The composition of claim 12 wherein the 1-olefin is isobutylene.

22. The composition of claim 13 wherein the 1-olefin is isobutylene.

23. The composition of claim 1 wherein each of $R^1$ and $R^2$ is independently H or lower alkyl.

24. The composition of claim 23 wherein one of $R^1$ and $R^2$ is H and the other is lower alkyl.

25. The composition of claim 1 wherein $R^6$ is an aliphatic group containing from about 8 to about 150 carbon atoms.

26. The composition of claim 1 wherein one of $R^9$ and $R^{10}$ is a group of the formula $-(Y)_a R^{11}-B$.

27. The composition of claim 26 wherein a is a number ranging from 1 about 6 and Y is a group of the formula

28. The composition of claim 26 wherein B is a group of the formula

wherein each $R^{12}$ is independently H, alkoxyalkyl, hydroxyalkyl, hydrocarbyl, aminohydrocarbyl, N-alkoxyalkyl- or hydroxyalkyl-substituted aminohydrocarbyl, and T is an acyl group.

29. The composition of claim 28 wherein T is a group of the formula

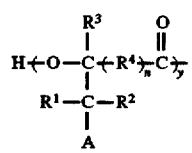

(IV)

wherein each element of formula (IV) is defined in claim 1; or T, $R^{12}$ and N taken together form a succinimide group.

30. The composition of claim 26 wherein a is a number ranging from 1 to about $5^a$ and Y is the group of the formula

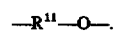

31. The composition of claim 26 wherein Y is a group of the formula

B is a hydroxyhydrocarbyl group of the formula

wherein Ar is an aromatic group, and c is an integer ranging from 1 up to the number of unsatisfied valences of Ar.

32. The composition of claim 1 wherein at least one of $R^9$ and $R^{10}$ is an aminohydrocarbyl group of the formula

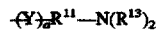

wherein each $R^{13}$ is independently H, alkoxyalkyl, hydroxyalkyl or hydrocarbyl.

33. A process comprising first reacting, optionally in the presence of an acidic catalyst selected from the group consisting of organic sulfonic acids, heteropolyacids, Lewis acids, and mineral acids, (A) at least one olefinic compound containing at least one group of the formula

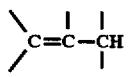

and (B) at least one carboxylic reactant selected from the group consisting of compounds of the formula $$R^3C(O)(R^4)_nC(O)OR^5 \quad \text{(IV)}$$

and compounds of the formula

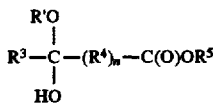
(V)

wherein each of $R^3$, $R^5$ and $R^9$ is independently H or a hydrocarbyl group, $R^4$ is a divalent hydrocarbylene group, and n is 0 or 1; wherein (A) and (B) are reacted in amounts ranging from 0.6 moles (B) per mole of (A) to 1.5 moles (B) per equivalent of (A); then reacting the product formed thereby with from about 0.5 equivalents up to about 2 moles, per mole of (B) of at least one of (C) ammonia or a hydrazine or an amine characterized by the presence within its structure of at least one H—N group.

34. The process of claim 33 wherein $R^4$ contains from 1 to about 3 carbon atoms.

35. The process of claim 33 wherein n=0.

36. The process of claim 35 wherein the at least one reactant (B) is glyoxylic acid.

37. The process of claim 33 wherein the at least one reactant (B) is the compound of the formula

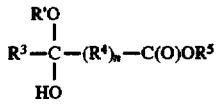
(V)

wherein each $R^3$ is H and $R^5$ and $R^9$ are lower alkyl groups selected from the group consisting of methyl, ethyl, propyl and butyl and n=0.

38. The process of claim 33 wherein the olefinic compound has the general formula $$(R^1)(R^2)C=C(R^6)(CH(R^7)(R^8)) \quad \text{(III)}$$

wherein each of $R^1$ and $R^2$ is, independently, hydrogen or a hydrocarbon based group and each of $R^6$, $R^7$ and $R^8$ is, independently, hydrogen or a hydrocarbon based group.

39. The process of claim 38 wherein each of $R^1$ and $R^2$ is hydrogen and $R^6$ is H or a lower alkyl group and the group $(CH(R^7)(R^8))$ is a hydrocarbyl group containing from 7 to about 5000 carbon atoms.

40. The process of claim 39 wherein the olefinic compound has $\overline{M}_n$ ranging from about 100 to about 70,000.

41. The process of claim 39 wherein the group $(CH(R^7)(R^8))$ is an aliphatic group containing from about 30 to about 200 carbon atoms and the olefinic compound is derived from homopolymerized and interpolymerized $C_{2-18}$ olefins.

42. The process of claim 41 wherein the group $(CH(R^7)(R^8))$ contains from about 50 to about 100 carbon atoms.

43. The process of claim 40 wherein the olefinic compound has $\overline{M}_n$ ranging from about 400 to about 3,000.

44. The process of claim 40 wherein the olefinic compound has $\overline{M}_n$ ranging from about 1,300 to about 5,000.

45. The process of claim 41 wherein the olefinic compound is a polyolefin comprising a mixture of isomers, at least about 50% by weight of the mixture comprising isomers of the formula $$H_2C=C(R^6)(CH(R^7)(R^8))$$

wherein $R^6$ is H or lower alkyl.

46. The process of claim 45 wherein the polyolefin is a polybutene.

47. The process of claim 46 wherein the polybutene is polyisobutylene.

48. The process of claim 45 wherein $R^6$ is methyl.

49. The process of claim 38 wherein the olefinic compound is a polyolefin comprising a mixture of isomers wherein from about 50% to 65% are trisubstituted olefins wherein one substituent contains from 2 to about 5000 carbon atoms and the other two substituents are lower alkyl.

50. The process of claim 49 wherein the trisubstituted olefin comprises a mixture of cis-and trans- 1-lower alkyl, 1-aliphatic hydrocarbyl containing from about 30 to about 100 carbon atoms, 2-lower alkyl ethene and 1,1-di-lower alkyl, 2-(aliphatic hydrocarbyl containing from 30 to about 100 carbon atoms) ethene.

51. The process of claim 49 wherein the polyolefin is a polybutene.

52. The process of claim 51 wherein the polybutene is polyisobutylene.

53. The process of claim 38 wherein the olefinic compound is a linear α-olefin containing from 8 to about 28 carbon atoms.

54. The process of claim 33 wherein the olefinic compound is a ethylene-alpha olefin-diene copolymer.

55. The process of claim 54 wherein the alpha olefin is a lower olefin and the diene is a non-conjugated diene.

56. The process of claim 33 wherein the olefinic compound is a polyolefinic compound.

57. The process of claim 33 wherein the olefinic compound is a polydiene polymer.

58. The process of claim 33 wherein the reaction between (A) and (B) is conducted in the presence of an acid catalyst.

59. The process of claim 58 wherein the acid catalyst is selected from the group consisting of a mineral acid and an organic sulfonic acid.

60. The process of claim 33 wherein the reaction between (A) and (B) is conducted in the absence of an acidic catalyst.

61. The process of claim 33 wherein (C) is an alkylene polyamine.

62. The process of claim 33 wherein (C) is an alkylene polyamine bottoms product.

63. The process of claim 33 wherein (C) is a condensed polyamine derived from at least one hydroxy-containing material and at least one alkylene polyamine or alkylene polyamine bottoms product.

64. The process of claim 61 wherein the alkylene polyamine is at least one member of the group consisting of diethylene triamine, dimethyl aminopropylamine, ethylene aliamine,and aminoethylpiperazine.

65. A composition prepared by the process of claim 33.

66. An additive concentrate for formulating lubricating oil or fuel compositions comprising from about 20% to about 90% by weight of a normally liquid, substantially inert organic solvent/diluent and from about 10% to about 80% by weight of the composition described in claim 1.

67. An additive concentrate for formulating lubricating oil or fuel compositions comprising from about 20% to about 90% by weight of a normally liquid, substantially inert organic solvent/diluent and from about 10% to about 80% by weight of the composition described in claim 65.

68. A lubricating composition comprising a major amount of an oil of lubricating viscosity and a minor amount of the composition described in claim 1.

69. A lubricating composition comprising a major amount of an oil of lubricating viscosity and a minor amount of the composition described in claim 65.

70. A fuel composition comprising a major amount of a normally liquid fuel and a minor amount of the composition described in claim 1.

71. A fuel composition comprising a major amount of a normally liquid fuel and a minor amount of the composition described in claim 65.

72. A fuel composition according to claim 70 further comprising a fluidizer.

73. A fuel composition according to claim 71 further comprising a fluidizer.

74. A fuel composition according to claim 72 wherein the fluidizer is selected from the group consisting of mineral oils and synthetic oils having viscosity measured at 100° C. of from about 2 cSt to about 25 cSt.

75. A fuel composition according to claim 73 wherein the fluidizer is selected from the group consisting of mineral oils and synthetic oils having viscosity measured at 100° C. of from about 2 cSt to about 25 cSt.

76. A fuel composition according to claim 74 wherein the fluidizer is a synthetic oil selected from the group consisting of polyoxyalkylene mono- and polyols, ether derivatives thereof and N-vinylpyrrolidinone addition products thereof, polyalphaolefins, and hydrogenated polyalphaolefins.

77. A fuel composition according to claim 75 wherein the fluidizer is a synthetic oil selected from the group consisting of polyoxyalkylene mono- and polyols, ether derivatives thereof and N-vinylpyrrolidinone addition products thereof, polyalphaolefins, and hydrogenated polyalphaolefins.

78. A fuel composition according to claim 70 further comprising an auxiliary dispersant selected from the group consisting of Mannich type dispersants acylated nitrogen dispersants, ester dispersants, aminophenol dispersants, aminocarbamate dispersants, and amine dispersants.

79. A fuel composition according to claim 71 further comprising an auxiliary dispersant selected from the group consisting of Mannich type dispersants, acylated nitrogen dispersants, ester dispersants, aminophenol dispersants, aminocarbamate dispersants, and amine dispersants.

80. A fuel composition according to claim 70 wherein the normally liquid fuel comprises gasoline.

81. A fuel composition according to claim 71 wherein the normally liquid fuel comprises gasoline.

82. A fuel composition according to claim 70 wherein the normally liquid fuel comprises oxygenates.

83. A fuel composition according to claim 71 wherein the normally liquid fuel comprises oxygenates.

84. A fuel composition according to claim 70 wherein the normally liquid fuel is a diesel fuel oil.

85. A fuel composition according to claim 71 wherein the normally liquid fuel is a diesel fuel oil.

* * * * *